(12) United States Patent
Gulati et al.

(10) Patent No.: US 11,808,843 B2
(45) Date of Patent: Nov. 7, 2023

(54) RADAR REPEATERS FOR NON-LINE-OF-SIGHT TARGET DETECTION

(71) Applicant: QUALCOMM Incorporated, San Diego, CA (US)

(72) Inventors: Kapil Gulati, Hillsborough, NJ (US); Junyi Li, Chester, NJ (US); Raju Hormis, New York, NY (US); Navid Abedini, Somerset, NJ (US)

(73) Assignee: QUALCOMM INCORPORATED, San Diego, CA (US)

( * ) Notice: Subject to any disclaimer, the term of this patent is extended or adjusted under 35 U.S.C. 154(b) by 354 days.

(21) Appl. No.: 16/997,328

(22) Filed: Aug. 19, 2020

(65) Prior Publication Data

US 2021/0116560 A1 Apr. 22, 2021

Related U.S. Application Data

(60) Provisional application No. 62/893,660, filed on Aug. 29, 2019, provisional application No. 62/893,678, filed on Aug. 29, 2019.

(51) Int. Cl.
*G01S 13/931* (2020.01)
*G01S 13/42* (2006.01)

(52) U.S. Cl.
CPC .......... *G01S 13/931* (2013.01); *G01S 13/426* (2013.01); *G01S 2013/9316* (2020.01); *G01S 2013/9329* (2020.01)

(58) Field of Classification Search
CPC ...... G01S 13/867; G01S 13/887; G01S 17/89; G01V 8/005
See application file for complete search history.

(56) References Cited

U.S. PATENT DOCUMENTS 4,163,235 A 7/1979 Schultz
6,914,554 B1 7/2005 Riley et al.
(Continued)

FOREIGN PATENT DOCUMENTS

| EP | 0709911 A2 | 5/1996 |
| JP | 2002214337 A | 7/2002 |
| WO | 0152447 A2 | 7/2001 |

OTHER PUBLICATIONS

Partial International Search Report—PCT/US2020/047208—ISA/EPO—dated Nov. 2, 2020.
(Continued)

*Primary Examiner* — Timothy A Brainard
(74) *Attorney, Agent, or Firm* — Muncy, Geissler, Olds & Lowe, P.C.

(57) ABSTRACT

Disclosed are techniques for non-line-of-sight (NLOS) target detection. In an aspect, a source vehicle receives, from a roadside unit (RSU), a notification that the RSU is capable of repeating radar signals transmitted by the source vehicle in NLOS directions from the source vehicle, receives, from an active radar repeater associated with the RSU, radar signals for a radar beam sweep in at least one NLOS direction from the source vehicle, receives an angle of each beam of the radar beam sweep, and performs target object detection based on the radar signals for the at least one NLOS direction and the angle of each beam of the radar beam sweep. Example architectures for the active radar repeater are also disclosed.

21 Claims, 17 Drawing Sheets

(56) References Cited

U.S. PATENT DOCUMENTS

| | | | | |
|---|---|---|---|---|
| 9,223,020 | B1* | 12/2015 | Crosmer | G01S 7/003 |
| 2005/0046584 | A1* | 3/2005 | Breed | B60R 21/01536 |
| | | | | 340/13.31 |
| 2010/0149020 | A1* | 6/2010 | Arnold | G08G 1/08 |
| | | | | 342/90 |
| 2012/0268306 | A1* | 10/2012 | Coburn | G08G 1/096775 |
| | | | | 342/20 |
| 2018/0113209 | A1 | 4/2018 | Campbell | |
| 2019/0033439 | A1* | 1/2019 | Gu | G01S 7/415 |
| 2020/0143167 | A1* | 5/2020 | Hayashi | G06V 10/56 |
| 2021/0231771 | A1* | 7/2021 | Bengtsson | H04B 7/0695 |

OTHER PUBLICATIONS

Hong W., et al., "Multibeam Antenna Technologies for 5G Wireless Communications", IEEE Transactions on Antennas and Propagation. IEEE Service Center, Piscataway. NJ. US. vol. 65. No. 12, Dec. 1, 2017 (Dec. 1, 2017), XP011673554, pp. 6231-6249, ISSN: 0018-926X. DOI: 10.1109/TAP.2017.2712819 [retrieved on Nov. 28, 2017] paragraph [II.C]-paragraph [III.A], figures 8,10a.
International Search Report and Written Opinion—PCT/US2020/047208—ISA/EPO—dated Feb. 1, 2021.

* cited by examiner

RADAR REPEATERS FOR NON-LINE-OF-SIGHT TARGET DETECTION

CROSS-REFERENCE TO RELATED APPLICATIONS

The present Application for Patent claims the benefit of U.S. Provisional Application No. 62/893,660, entitled "RADAR REPEATERS FOR NON-LINE-OF-SIGHT TARGET DETECTION," filed Aug. 29, 2019, and U.S. Provisional Application No. 62/893,678, entitled "RADAR REPEATERS FOR NON-LINE-OF-SIGHT TARGET DETECTION," filed Aug. 29, 2019, each of which are assigned to the assignee hereof, and expressly incorporated herein by reference in its entirety.

1. TECHNICAL FIELD

Aspects of this disclosure relate generally to autonomous or semi-autonomous driving techniques.

2. BACKGROUND

Modern motor vehicles are increasingly incorporating technology that helps drivers avoid drifting into adjacent lanes or making unsafe lane changes (e.g., lane departure warning (LDW)), or that warns drivers of other vehicles behind them when they are backing up, or that brakes automatically if a vehicle ahead of them stops or slows suddenly (e.g., forward collision warning (FCW)), among other things. The continuing evolution of automotive technology aims to deliver even greater safety benefits, and ultimately deliver automated driving systems (ADS) that can handle the entire task of driving without the need for user intervention.

There are six levels that have been defined to achieve full automation. At Level 0, the human driver does all the driving. At Level 1, an advanced driver assistance system (ADAS) on the vehicle can sometimes assist the human driver with either steering or braking/accelerating, but not both simultaneously. At Level 2, an ADAS on the vehicle can itself actually control both steering and braking/accelerating simultaneously under some circumstances. The human driver must continue to pay full attention at all times and perform the remainder of the driving tasks. At Level 3, an ADS on the vehicle can itself perform all aspects of the driving task under some circumstances. In those circumstances, the human driver must be ready to take back control at any time when the ADS requests the human driver to do so. In all other circumstances, the human driver performs the driving task. At Level 4, an ADS on the vehicle can itself perform all driving tasks and monitor the driving environment, essentially doing all of the driving, in certain circumstances. The human need not pay attention in those circumstances. At Level 5, an ADS on the vehicle can do all the driving in all circumstances. The human occupants are just passengers and need never be involved in driving.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

An aspect of the disclosure includes a method of non-line-of-sight (NLOS) target detection performed by a source vehicle, including: receiving, from a roadside unit (RSU), a notification that the RSU is capable of repeating radar signals transmitted by the source vehicle in NLOS directions from the source vehicle; receiving, from an active radar repeater associated with the RSU, radar signals for a radar beam sweep in at least one NLOS direction from the source vehicle; receiving, from the RSU, an angle of each beam of the radar beam sweep; and performing target object detection based on the radar signals for the at least one NLOS direction and the angle of each beam of the radar beam sweep.

An aspect of the disclosure includes a method of assisting NLOS target detection performed by an RSU, including: transmitting, to a source vehicle, a notification that the RSU is capable of repeating radar signals transmitted by the source vehicle in NLOS directions from the source vehicle; configuring an active radar repeater to perform a radar beam sweep in at least one NLOS direction from the source vehicle; and transmitting, to the source vehicle, an angle of each beam of the radar beam sweep.

An aspect of the disclosure includes an apparatus for NLOS target detection, including: a radar of a source vehicle; at least one processor of the source vehicle, the at least one processor coupled to a memory of the source vehicle; and at least one transceiver of the source vehicle coupled to the at least one processor and configured to: receive, from an RSU, a notification that the RSU is capable of repeating radar signals transmitted by the radar of the source vehicle in NLOS directions from the source vehicle; receive, from an active radar repeater associated with the RSU, radar signals for a radar beam sweep in at least one NLOS direction from the source vehicle; and receive, from the RSU, an angle of each beam of the radar beam sweep, wherein the at least one processor of the source vehicle is configured to perform target object detection based on the radar signals for the at least one NLOS direction and the angle of each beam of the radar beam sweep.

An aspect of the disclosure includes an apparatus for assisting NLOS target detection, including: at least one processor of an RSU, the at least one processor coupled to a memory of the RSU; and at least one transceiver of the RSU coupled to the at least one processor and configured to: transmit, to a source vehicle, a notification that the RSU is capable of repeating radar signals transmitted by the source vehicle in NLOS directions from the source vehicle; configure an active radar repeater to perform a radar beam sweep in at least one NLOS direction from the source vehicle; and transmit, to the source vehicle, an angle of each beam of the radar beam sweep.

An aspect of the disclosure includes a source vehicle, including: means for receiving, from an RSU, a notification that the RSU is capable of repeating radar signals transmitted by the source vehicle in NLOS directions from the source vehicle; means for receiving, from an active radar repeater associated with the RSU, radar signals for a radar beam sweep in at least one NLOS direction from the source vehicle; means for receiving, from the RSU, an angle of each beam of the radar beam sweep; and means for performing target object detection based on the radar signals for the at least one NLOS direction and the angle of each beam of the radar beam sweep.

An aspect of the disclosure includes an RSU, including: means for transmitting, to a source vehicle, a notification that the RSU is capable of repeating radar signals transmitted by the source vehicle in NLOS directions from the source vehicle; means for configuring an active radar repeater to perform a radar beam sweep in at least one NLOS direction from the source vehicle; and means for transmitting, to the source vehicle, an angle of each beam of the radar beam sweep.

An aspect of the disclosure includes a non-transitory computer-readable medium storing computer-executable instructions, the computer-executable instructions including: at least one instruction instructing a source vehicle to receive, from an RSU, a notification that the RSU is capable of repeating radar signals transmitted by the source vehicle in NLOS directions from the source vehicle; at least one instruction instructing the source vehicle to receive, from an active radar repeater associated with the RSU, radar signals for a radar beam sweep in at least one NLOS direction from the source vehicle; at least one instruction instructing the source vehicle to receive, from the RSU, an angle of each beam of the radar beam sweep; and at least one instruction instructing a source vehicle to perform target object detection based on the radar signals for the at least one NLOS direction and the angle of each beam of the radar beam sweep.

An aspect of the disclosure includes a non-transitory computer-readable medium storing computer-executable instructions, the computer-executable instructions including: at least one instruction instructing an RSU to transmit, to a source vehicle, a notification that the RSU is capable of repeating radar signals transmitted by the source vehicle in NLOS directions from the source vehicle; at least one instruction instructing the RSU to configure an active radar repeater to perform a radar beam sweep in at least one NLOS direction from the source vehicle; and at least one instruction instructing the RSU to transmit, to the source vehicle, an angle of each beam of the radar beam sweep.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
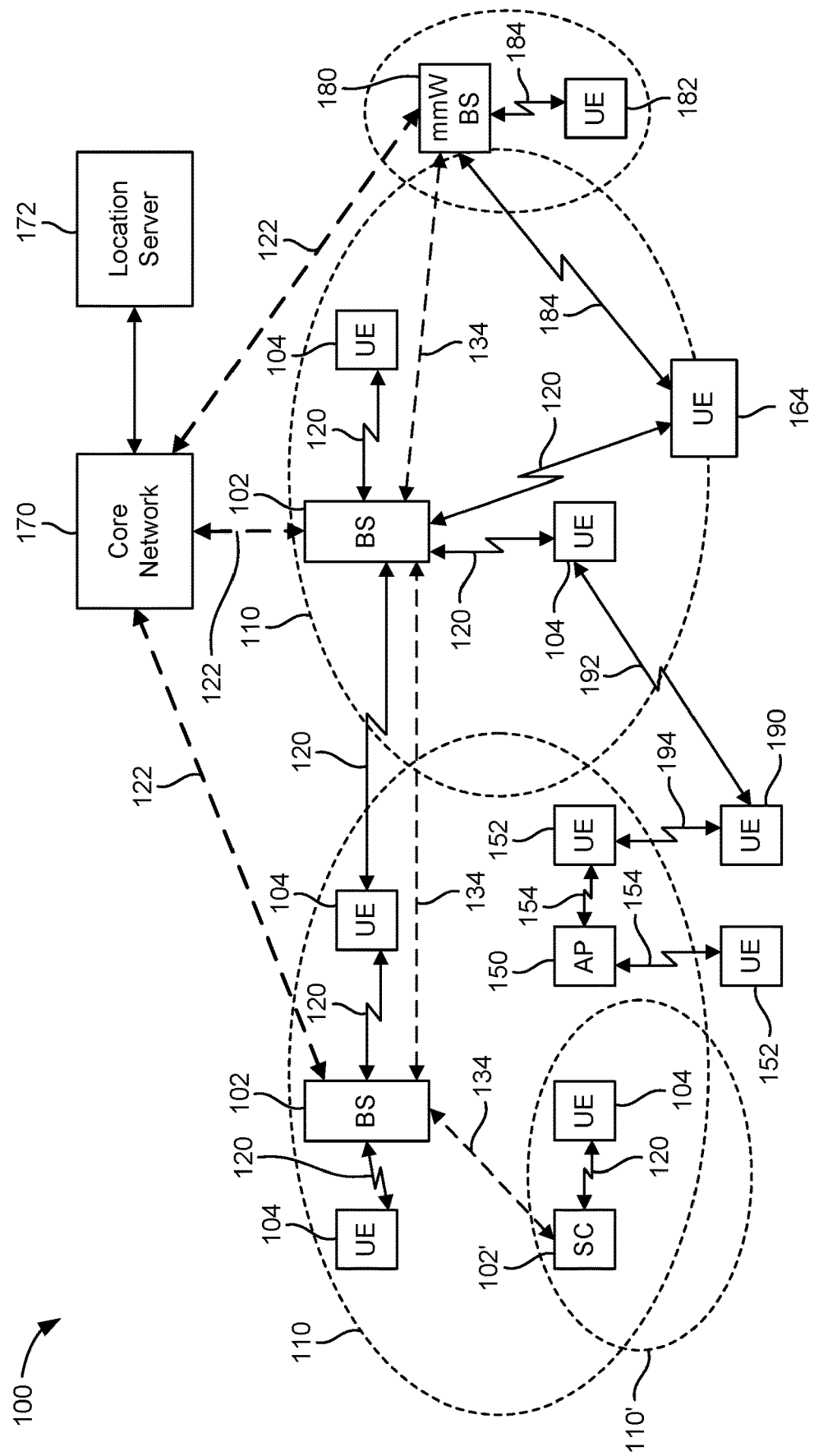
FIG. 1 is a diagram illustrating an example of a wireless communications system and an access network, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the 802.11 standard from the Institute of Electrical and Electronics Engineers (IEEE), etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna or antenna array of the base station corresponding to a cell (or several cell sectors) of the base station. Where the term "base station" refers to multiple co-located physical TRPs, each of the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas or antenna arrays connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

According to various aspects, FIG. 1 illustrates an example wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming a downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
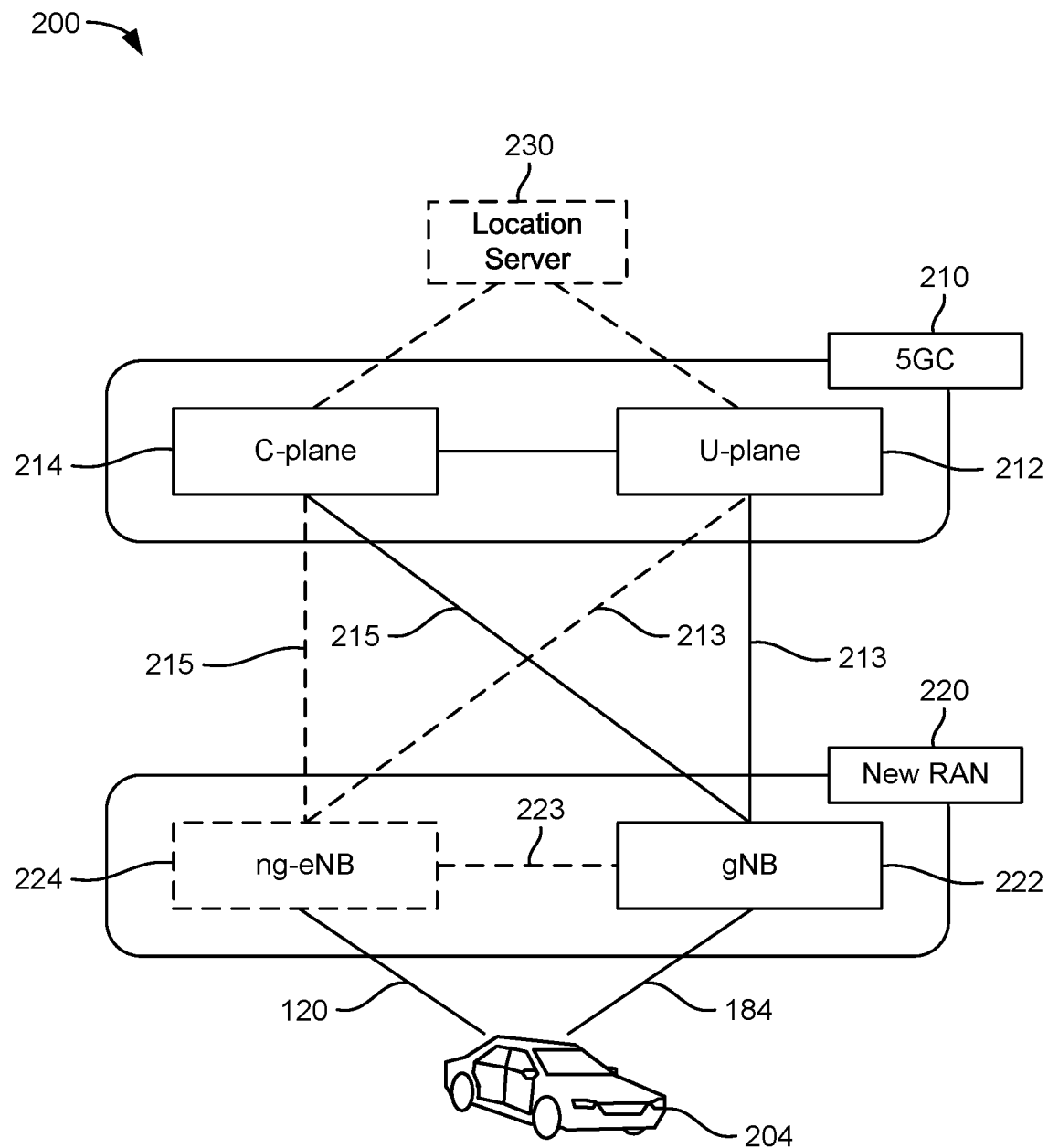
FIGS. 2A and 2B illustrate example wireless network structures, according to various aspects of the disclosure.

According to various aspects, FIG. 2A illustrates an example wireless network structure 200. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, Internet protocol (IP) routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
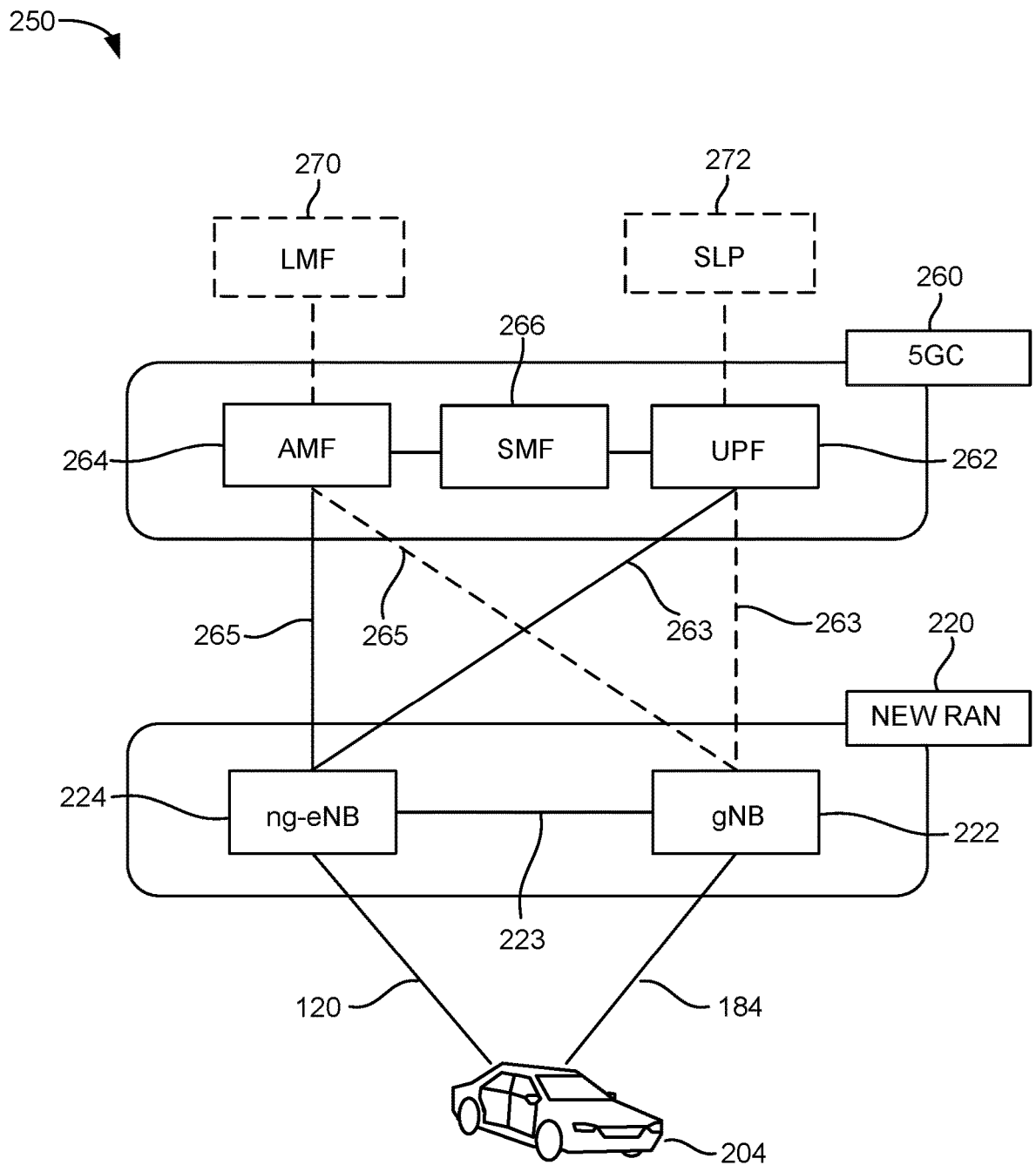

According to various aspects, FIG. 2B illustrates another example wireless network structure 250. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with a UE 204 (e.g., any of the UEs depicted in FIG. 1), which, in the example of FIG. 2A, is an autonomous or semi-autonomous vehicle. The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-Third Generation Partnership Project (3GPP) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE (IP address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

In an aspect, the LMF 270 and/or the SLP 272 may be integrated into a base station, such as the gNB 222 and/or the ng-eNB 224. When integrated into the gNB 222 and/or the ng-eNB 224, the LMF 270 and/or the SLP 272 may be referred to as a "location management component," or "LMC." However, as used herein, references to the LMF 270 and the SLP 272 include both the case in which the LMF 270 and the SLP 272 are components of the core network (e.g., 5GC 260) and the case in which the LMF 270 and the SLP 272 are components of a base station.

Autonomous and semi-autonomous driving safety technologies use a combination of hardware (sensors, cameras, and radar) and software to help vehicles identify certain safety risks so they can warn the driver to act (in the case of an ADAS), or act themselves (in the case of an ADS), to avoid a crash. A vehicle outfitted with an ADAS or ADS includes one or more camera sensors mounted on the vehicle that capture images of the scene in front of the vehicle, and also possibly behind and to the sides of the vehicle. Radar systems may also be used to detect objects along the road of travel, and also possibly behind and to the sides of the vehicle. Radar systems utilize RF waves to determine the range, direction, speed, and/or altitude of the objects along the road. More specifically, a transmitter transmits pulses of RF waves that bounce off any object(s) in their path. The pulses reflected off the object(s) return a small part of the RF waves' energy to a receiver, which is typically located at the same location as the transmitter. The camera and radar are typically oriented to capture their respective versions of the same scene.

A processor, such as a digital signal processor (DSP), within the vehicle analyzes the captured camera images and radar frames and attempts to identify objects within the captured scene. Such objects may be other vehicles, pedestrians, road signs, objects within the road of travel, etc. The radar system provides reasonably accurate measurements of object distance and velocity in various weather conditions. However, radar systems typically have insufficient resolution to identify features of the detected objects. Camera sensors, however, typically do provide sufficient resolution to identify object features. The cues of object shapes and appearances extracted from the captured images may provide sufficient characteristics for classification of different objects. Given the complementary properties of the two sensors, data from the two sensors can be combined (referred to as "fusion") in a single system for improved performance.

To further enhance ADAS and ADS systems, especially at Level 3 and beyond, autonomous and semi-autonomous vehicles may utilize high definition (HD) map datasets, which contain significantly more detailed information and true-ground-absolute accuracy than those found in current conventional resources. Such HD maps may provide accuracy in the 7-10 cm absolute ranges, highly detailed inventories of all stationary physical assets related to roadways, such as road lanes, road edges, shoulders, dividers, traffic signals, signage, paint markings, poles, and other data useful for the safe navigation of roadways and intersections by autonomous/semi-autonomous vehicles. HD maps may also provide electronic horizon predictive awareness, which enables autonomous/semi-autonomous vehicles to know what lies ahead.

Figure 3:
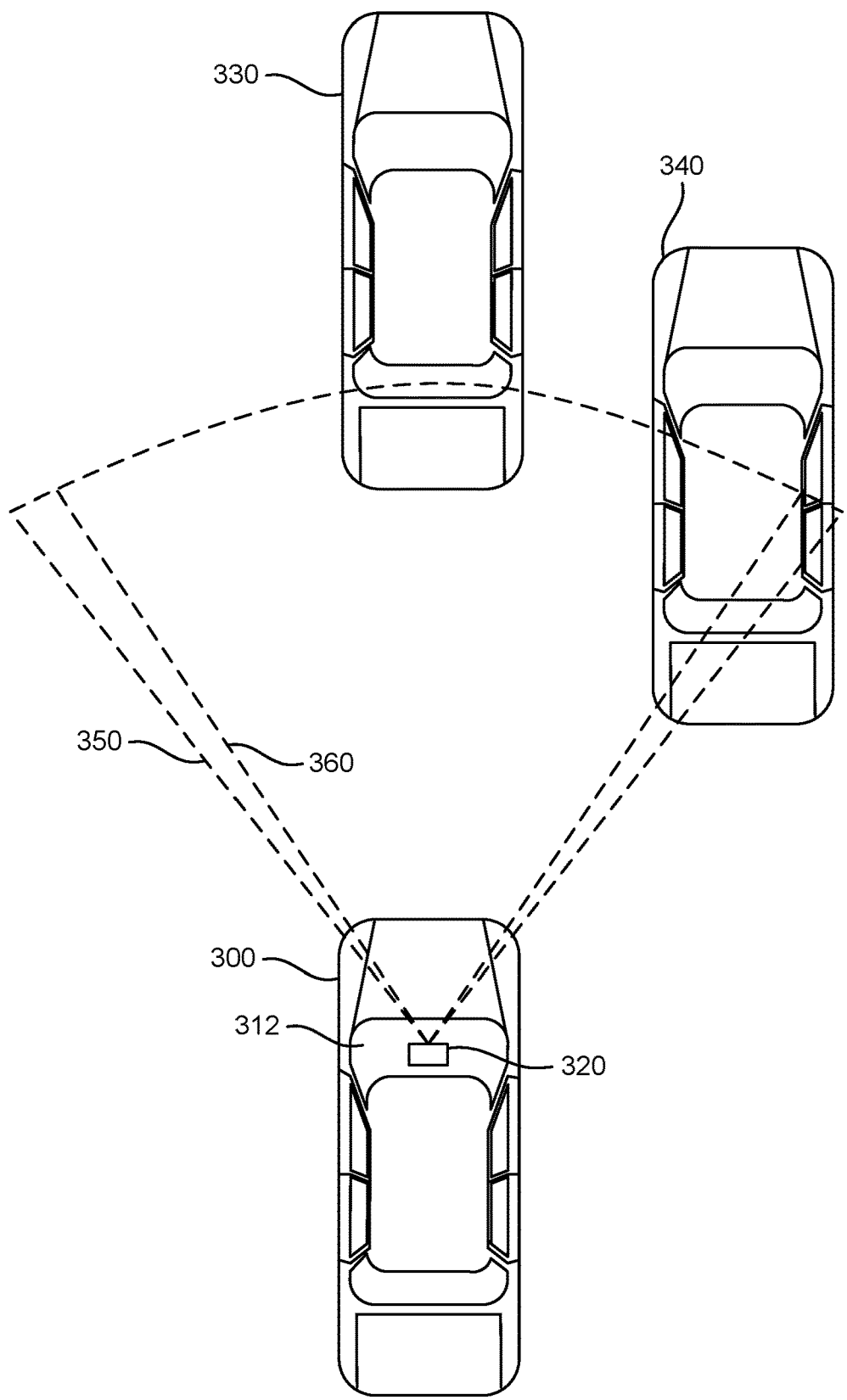
FIG. 3 is a top view of a vehicle employing an integrated radar-camera sensor behind the windshield, according to various aspects of the disclosure.

Referring now to FIG. 3, a vehicle 300 (referred to as an "ego vehicle" or a "host vehicle") is illustrated that includes a radar-camera sensor module 320 located in the interior compartment of the vehicle 300 behind the windshield 312. The radar-camera sensor module 320 includes a radar component configured to transmit radar signals through the windshield 312 in a horizontal coverage zone 350 (shown by dashed lines), and receive reflected radar signals that are reflected off of any objects within the coverage zone 350. The radar-camera sensor module 320 further includes a camera component for capturing images based on light waves that are seen and captured through the windshield 312 in a horizontal coverage zone 360 (shown by dashed lines).

Although FIG. 3 illustrates an example in which the radar component and the camera component are co-located components in a shared housing, as will be appreciated, they may be separately housed in different locations within the vehicle 300. For example, the camera may be located as shown in FIG. 3, and the radar component may be located in the grill or front bumper of the vehicle 300. Additionally, although FIG. 3 illustrates the radar-camera sensor module 320 located behind the windshield 312, it may instead be located in a rooftop sensor array, or elsewhere. Further, although FIG. 3 illustrates only a single radar-camera sensor module 320, as will be appreciated, the vehicle 300 may have multiple radar-camera sensor modules 320 pointed in different directions (to the sides, the front, the rear, etc.). The various radar-camera sensor modules 320 may be under the "skin" of the vehicle (e.g., behind the windshield 312, door panels, bumpers, grills, etc.) or within a rooftop sensor array.

The radar-camera sensor module 320 may detect one or more (or none) objects relative to the vehicle 300. In the example of FIG. 3, there are two objects, vehicles 330 and 340, within the horizontal coverage zones 350 and 360 that the radar-camera sensor module 320 can detect. The radar-camera sensor module 320 may estimate parameters (attributes) of the detected object(s), such as the position, range, direction, speed, size, classification (e.g., vehicle, pedestrian, road sign, etc.), and the like. The radar-camera sensor module 320 may be employed onboard the vehicle 300 for automotive safety applications, such as adaptive cruise control (ACC), forward collision warning (FCW), collision mitigation or avoidance via autonomous braking, lane departure warning (LDW), and the like.

Collocating the camera and radar permits these components to share electronics and signal processing, and in particular, enables early radar-camera data fusion. For example, the radar and camera may be integrated onto a single board. A joint radar-camera alignment technique may be employed to align both the radar and the camera. However, collocation of the radar and camera is not required to practice the techniques described herein.

Figure 4:
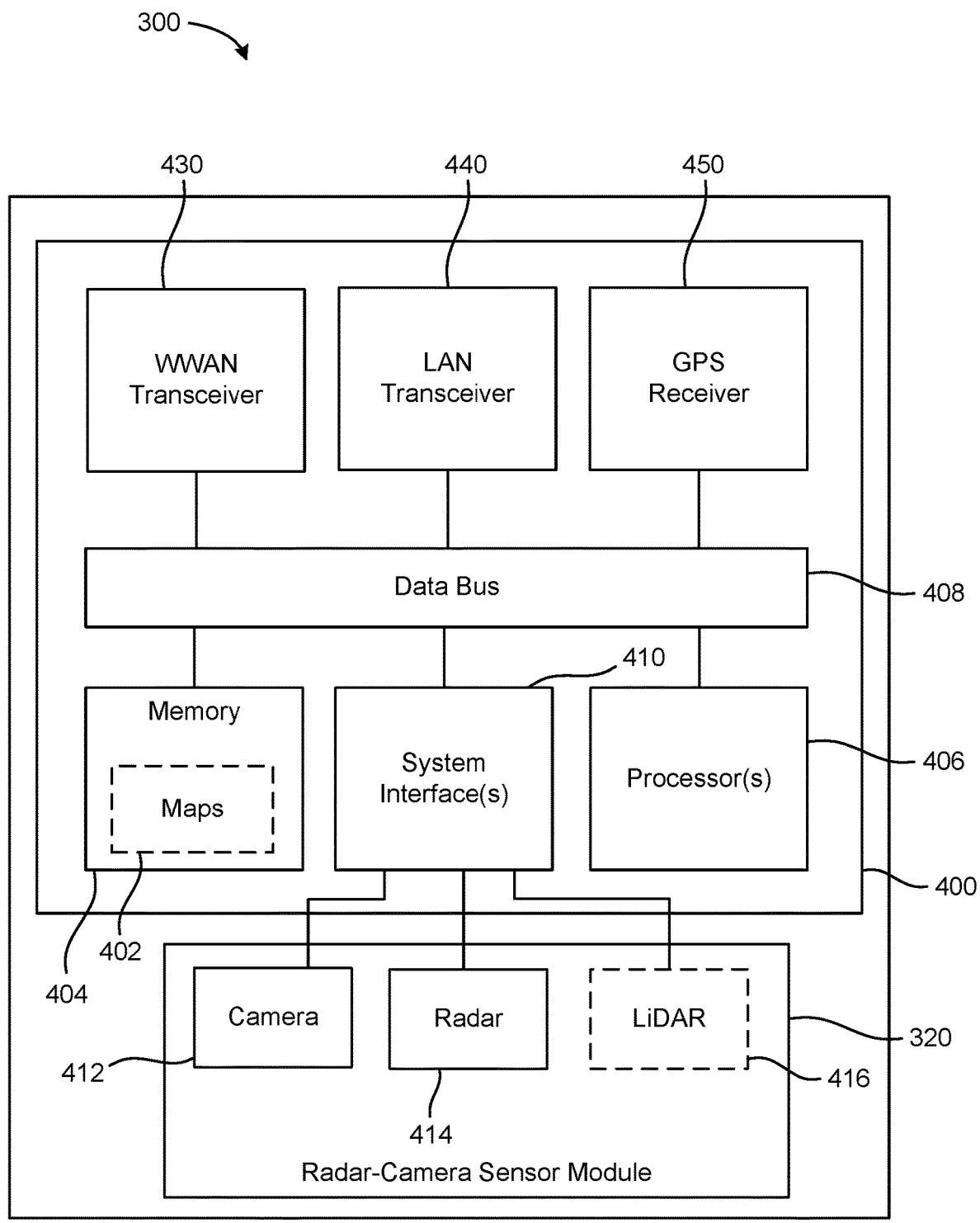
FIG. 4 illustrates an on-board computer architecture, according to various aspects of the disclosure.

FIG. 4 illustrates an on-board computer (OBC) 400 of a vehicle 300, according to various aspects of the disclosure. In an aspect, the OBC 400 may be part of an ADAS or ADS. The OBC 400 includes a non-transitory computer-readable storage medium, i.e., memory 404, and one or more processors 406 in communication with the memory 404 via a data bus 408. The memory 404 includes one or more storage modules storing computer-readable instructions executable by the processor(s) 406 to perform the functions of the OBC 400 described herein. For example, the processor(s) 406 in conjunction with the memory 404 may implement the various operations described herein.

One or more radar-camera sensor modules 320 are coupled to the OBC 400 (only one is shown in FIG. 4 for simplicity). In some aspects, the radar-camera sensor module 320 includes at least one camera 412, at least one radar 414, and an optional light detection and ranging (LiDAR) sensor 416. The OBC 400 also includes one or more system interfaces 410 connecting the processor(s) 406, by way of the data bus 408, to the radar-camera sensor module 320 and, optionally, other vehicle sub-systems (not shown).

The OBC 400 also includes, at least in some cases, a wireless wide area network (WWAN) transceiver 430 configured to communicate via one or more wireless communication networks (not shown), such as an NR network, an LTE network, a GSM network, and/or the like. The WWAN transceiver 430 may be connected to one or more antennas (not shown) for communicating with other network nodes, such as other vehicle UEs, pedestrian UEs, infrastructure access points, roadside units (RSUs), base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceiver 430 may be variously configured for transmitting and encoding signals (e.g., messages, indications, information, and so on), and, conversely, for receiving and decoding signals (e.g., messages, indications, information, pilots, and so on) in accordance with the designated RAT.

The OBC 400 also includes, at least in some cases, a wireless local area network (WLAN) transceiver 440. The WLAN transceiver 440 may be connected to one or more antennas (not shown) for communicating with other network nodes, such as other vehicle UEs, pedestrian UEs, infrastructure access points, RSUs, etc., via at least one designated RAT (e.g., cellular vehicle-to-everything (C-V2X), IEEE 802.11p (also known as wireless access for vehicular environments (WAVE)), dedicated short-range communication (DSRC), etc.) over a wireless communication medium of interest. The WLAN transceiver 440 may be variously configured for transmitting and encoding signals (e.g., messages, indications, information, and so on), and, conversely, for receiving and decoding signals (e.g., messages, indications, information, pilots, and so on) in accordance with the designated RAT.

As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a receiver chip or similar circuitry simply providing low-level sniffing).

The OBC 400 also includes, at least in some cases, a global positioning systems (GPS) receiver 450. The GPS receiver 450 may be connected to one or more antennas (not shown) for receiving satellite signals. The GPS receiver 450 may comprise any suitable hardware and/or software for receiving and processing GPS signals. The GPS receiver 450 requests information and operations as appropriate from the other systems, and performs the calculations necessary to determine the vehicle's 300 position using measurements obtained by any suitable GPS algorithm.

In an aspect, the OBC 400 may utilize the WWAN transceiver 430 and/or the WLAN transceiver 440 to download one or more maps 402 that can then be stored in memory 404 and used for vehicle navigation. Map(s) 402 may be one or more high definition (HD) maps, which may provide accuracy in the 7-10 cm absolute ranges, highly detailed inventories of all stationary physical assets related to roadways, such as road lanes, road edges, shoulders, dividers, traffic signals, signage, paint markings, poles, and other data useful for the safe navigation of roadways and intersections by vehicle 300. Map(s) 402 may also provide electronic horizon predictive awareness, which enables the vehicle 300 to know what lies ahead.

In an aspect, the camera 412 may capture image frames (also referred to herein as camera frames) of the scene within the viewing area of the camera 412 (as illustrated in FIG. 3 as horizontal coverage zone 360) at some periodic rate. Likewise, the radar 414 may capture radar frames of the scene within the viewing area of the radar 414 (as illustrated in FIG. 3 as horizontal coverage zone 350) at some periodic rate. The periodic rates at which the camera 412 and the radar 414 capture their respective frames may be the same or different. Each camera and radar frame may be time-stamped. Thus, where the periodic rates are different, the timestamps can be used to select simultaneously, or nearly simultaneously, captured camera and radar frames for further processing (e.g., fusion).

Figure 5:
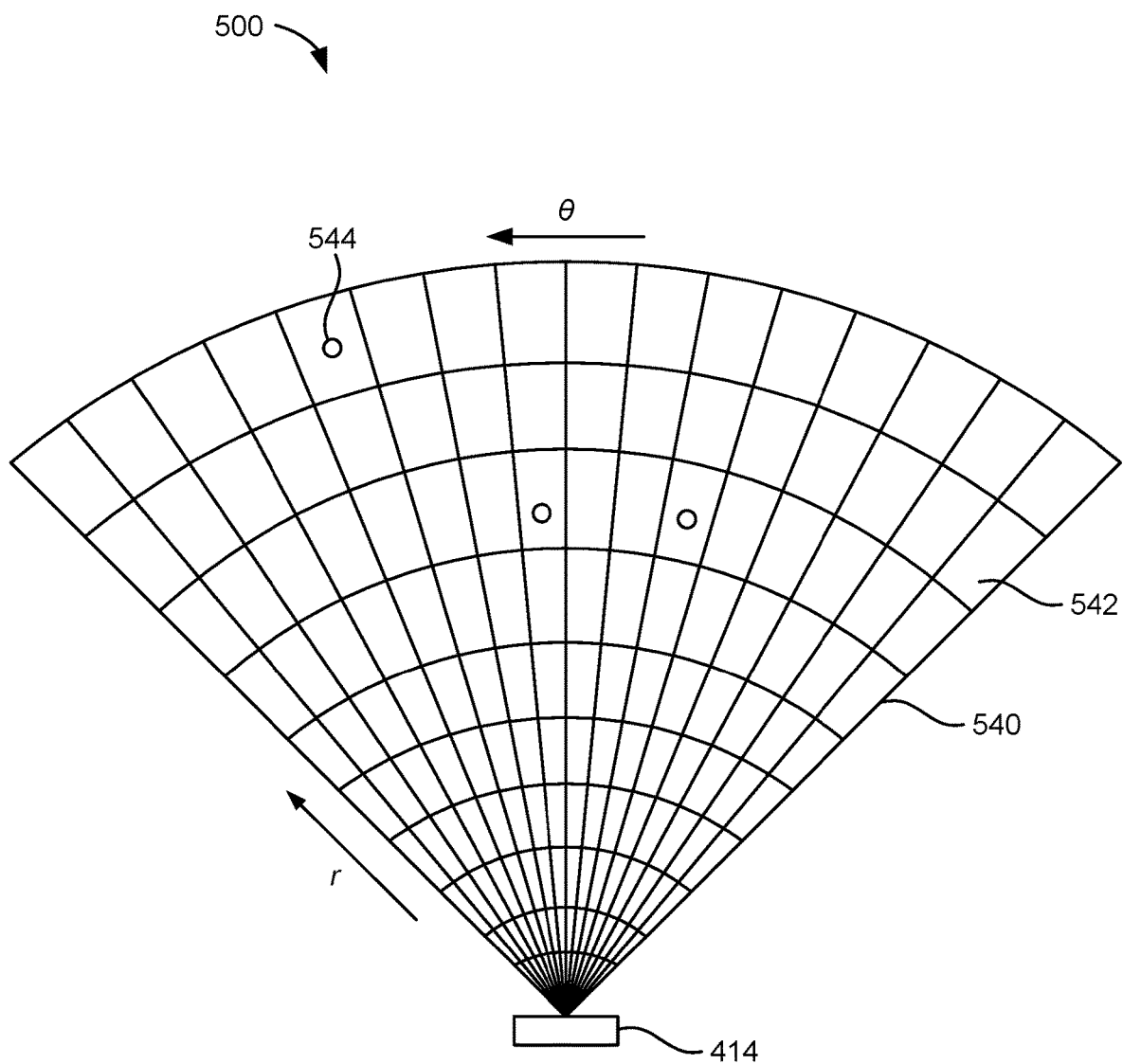
FIG. 5 is a schematic of a sensed observation radar grid, according to various aspects of the disclosure.

FIG. 5 illustrates a sensed observation radar grid 500. A transmitter (e.g., an array of transmit antennas) of the radar 414 transmits pulses of electromagnetic RF waves that reflect from object(s) in the transmission path, such as vehicles 330 and 340 in FIG. 3. A portion of the electromagnetic RF waves that are reflected from the object(s) are returned to the receiver (e.g., an array of receive antennas) of the radar 414, which is usually located at the same site as the transmitter of the radar 414.

In an aspect, the radar 414 may be an imaging radar that uses beamforming to scan horizontally and vertically. Beamforming is a technique used to aim the effective direction of a radar beam by changing the delay between different transmitting antennas so that the signals add constructively in a specified direction. Thus, the radar 414 may scan horizontally and vertically across the sensing area (e.g., horizontal coverage zone 350) by using a transmitter comprising an array of electronically steered antennas.

The returned responses (which may also be referred to as "pings") measured by the radar 414 is characterized as an observation (or occupancy) grid 540 having a plurality of observation cells 542. Each cell 542 represents the measured returned response value at a specific range (r) and angle/azimuth ($\theta$). Each cell 542 is alternately referred to as a range-angle bin. Features 544 are extracted from the cells 542 to determine whether the feature 544 is an object (e.g., a vehicle 330/340). Each feature 544 within a respective cell 542 can be identified as having up to four parameters: range, Doppler, azimuth, and elevation. This is called a radar frame. As an example, a feature 544 within a cell 542 may be the signal-to-noise ratio (SNR) computed by a constant false alarm rate (CFAR) algorithm. However, it should be understood that other methods may be used to target and identify features 544 within a cell 542.

The processor(s) 406 may generate two-dimensional (2D), three-dimensional (3D), or four dimensional (4D) tensors for features 544 within cells 542 of the observation grid 540 detected by the radar 414. Specifically, a 2D tensor represents the range (distance from the vehicle 300 to the detected feature 544) and azimuth (the horizontal distance between a feature 544 and a reference RF ray emitted by the radar 414, such as the initial RF ray of a radar sweep) of each detected feature 544. A 3D tensor represents the range, azimuth, and Doppler (indicating the speed of the detected feature 544) or elevation (vertical direction from the radar 414 to the detected feature) of each detected feature 544. A 4D tensor represents all four quantities. The processor(s) 406 then performs object detection, object classification, localization, and property/attribute estimation based on the tensors and undistorted camera frames received from the camera 412.

Radar is primarily a line-of-sight (LOS) sensor. Based on the time of flight of a transmitted radar signal (i.e., the difference between the transmission time of the radar signal and the reception time of a reflection of the radar signal), the distance from the transmitter (e.g., vehicle 300) to a reflective target (e.g., vehicle 330, 340) can be determined. In addition, the angle to the target can be determined from the angle from which the reflected signal is received, and the relative velocity of the target with respect to the source can be determined from the Doppler of the reflected signal. However, this information may only be determined accurately in a LOS scenario. For example, multiple reflections of the radar signal (a non-LOS scenario) can severely attenuate the radar signal, making it difficult to detect the target. Also, it may not be possible to localize the target, as the estimated angle is of the last reflector, and as such, may not contain any information regarding the reflector-to-target angle. This is illustrated in FIG. 6.

Figure 6:
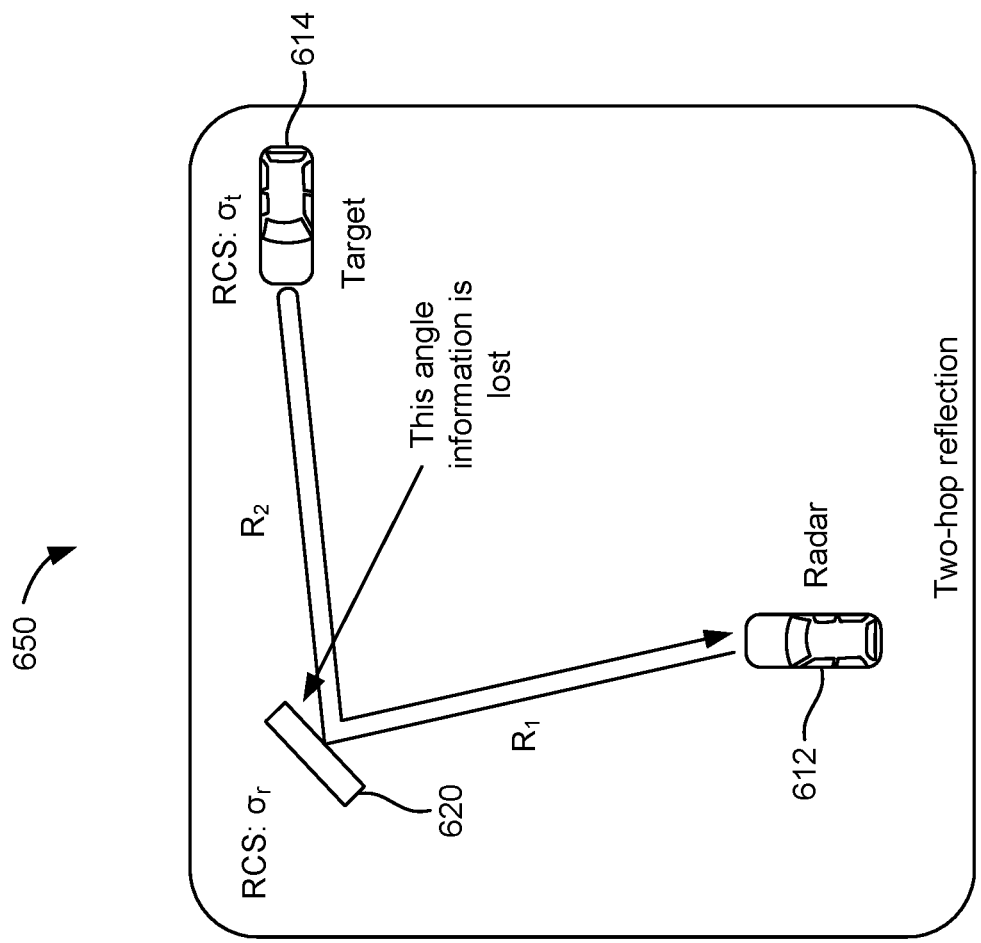
FIG. 6 illustrates a comparison of a direct reflection and a two-hop reflection, according to aspects of the disclosure.
Figure 6:
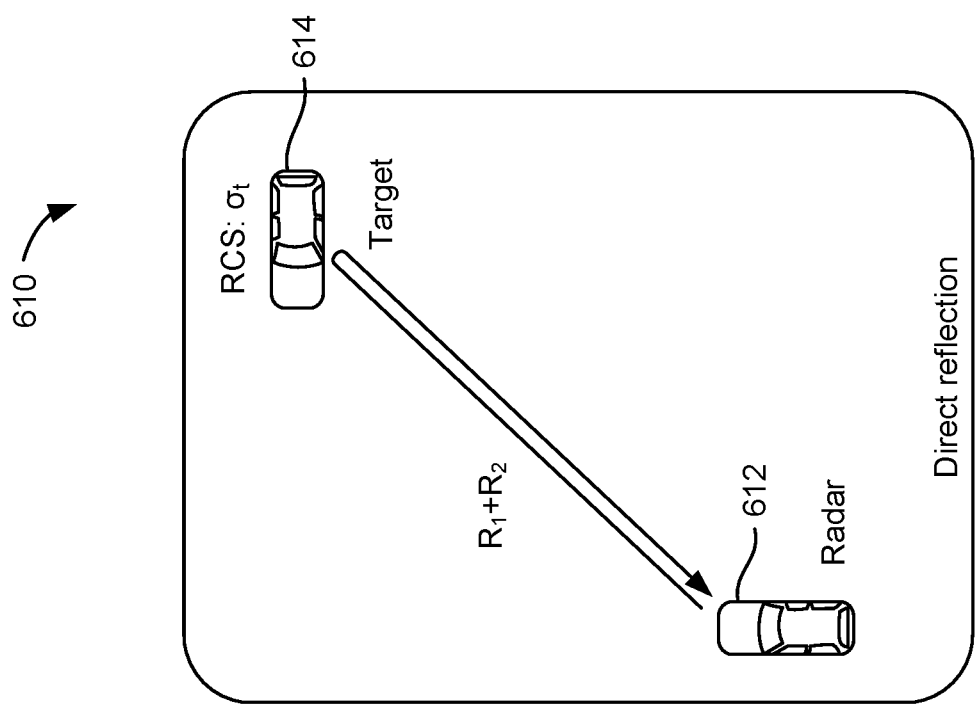

FIG. 6 illustrates a comparison of a direct reflection and a two-hop reflection, according to aspects of the disclosure. In a direct reflection scenario 610, a source vehicle 612 (e.g., any of the autonomous or semi-autonomous vehicles described herein) emits a radar signal that reflects off of a target vehicle 614. In a two-hop scenario 650, the source vehicle 612 emits a radar signal that reflects off of a reflector 620 (the first hop), then off of the target vehicle 614, and then off of the reflector 620 again (the second hop) before being received back at the source vehicle 612.

In the example of FIG. 6, the target vehicle 614 has a radar cross section (RCS) of $\sigma_t$ and the reflector 620 has an RCS of $\sigma_r$. The RCS is a measure of how detectable a target object is by radar. A larger RCS indicates that an object is more easily detected. A target object (e.g., target vehicle 614) reflects a limited amount of radar energy back to the source (e.g., source vehicle 612). The factors that influence how much radar energy is reflected back to the source include the material from which the target is made, the absolute size of the target, the relative size of the target with respect to the wavelength of the illuminating radar, the angle at which the radar beam hits a particular portion of the target (i.e., the incident angle or angle of incidence), which depends on the shape of the target and its orientation to the radar source, the angle at which the reflected beam leaves the part of the target hit (i.e., the reflected angle), which depends on the incident angle, and the polarization of the transmitted and the received radar signal with respect to the orientation of the target. While important in detecting targets, the strength of the emitted radar signal and the distance between the source and the target are not factors that affect the calculation of an RCS because RCS is a property of the target's reflectivity.

Referring to FIG. 6, the reflected radar signal received back at the source vehicle 612 will have some received signal strength. In the two-hop scenario 650, the signal strength between the source vehicle 612 and the reflector 620 is represented as $R_1$. The signal strength between the reflector 620 and the target vehicle 614 is represented as $R_2$. Thus, in the two-hop scenario 650, the reflection received at the source vehicle 612 only has a received signal strength of $R_1$, which may be hard for the source vehicle 612 to detect. In contrast, in the direct reflection scenario 610, the received power of the reflected radar signal at the source vehicle 612 is both $R_1$ and $R_2$, since there is no attenuation from a reflector.

Further, in the two-hop scenario 650, while the distance to the target vehicle 614 can be determined (because the reflector 620 does not affect the time of flight measurement), accurate localization of the target vehicle 614 is impossible. Specifically, as can be seen in the two-hop scenario 650, the angle of the transmitted radar signal from the reflector 620 to the target vehicle 614 is unknown; only the angle from the source vehicle 612 to the reflector 620 can be determined. Thus, due to the known time of flight and the angle of the received signal, the source vehicle 612 may incorrectly assume that the target vehicle 614 is in the direction of the reflector 620 at some LOS distance corresponding to the time of flight.

There are several aspects needed to enable non-LOS (NLOS) target detection. First, NLOS reflections should not be severely attenuated and should ideally have a transparent (i.e., 0 dB) change in signal power. That is, an NLOS reflection should have the same, or at least close to the same, received signal strength as an LOS reflection. Second, the radar system should be able to distinguish between NLOS and LOS reflections. For example, in the two-hop scenario 650, the source vehicle 612 should be able to identify that the received signal is an NLOS reflection. Third, there should be a method to enable estimation of the angles (azimuth and elevation) between the reflector (e.g., reflector 620) and the target (e.g., target vehicle 614). These aspects enable the source to accurately localize the target.

A similar problem exists for providing NLOS coverage for mmWave communications. To address the signal attenuation in mmWave caused by reflections, passive repeaters have been used to extend communication coverage, thereby eliminating, or at least reducing, the problem of signal attenuation. Additional enhancements of such repeaters include phase-shifting the reflection for NLOS versus LOS differentiation. Prior art examples include "Non Line-of-Sight Radar Detection Evaluation," by Soham Shah and Joey Zhu, which describes how passive reflectors can be used to enable NLOS radar detection. As another example, "Around-the-corner radar: detection of a human being in non-line of sight," by Olivier Rabaste et al., considers the problem of detecting a human being in NLOS in an urban environment via multiple paths. As another example, "Coverage Enhancement for mmWave Communications using Passive Reflectors," by Wahab Khawaja et al., discusses the use of passive reflectors for improving mmWave signal coverage in NLOS indoor areas. As yet another example, "FastForward: Fast and Constructive Full Duplex Relays," by Dinesh Bharadia and Sachin Katti, describes a full duplex relay that constructively forwards signals such that wireless network throughput and coverage is enhanced.

However, there are a number of drawbacks to using passive repeaters to meet the aspects needed to enable NLOS target detection for ADS purposes. Regarding the first aspect, passive reflectors may still significantly attenuate the signal, as they tend to have a low RCS. Regarding the second aspect, the radar system may still not able to distinguish between NLOS and LOS detections, unless some enhancement related to phase-shifting is being performed (in cases where the presence of a phase shift in the received signal indicates that it has been reflected). However, the main disadvantage of passive repeaters is with respect to the third aspect. Specifically, since the repeater is passive, the angle information is still lost. As such, there is still a need for situational awareness or advanced processing to combine an NLOS path with an LOS path (e.g., because the source may perform a radar "sweep," some paths to the same target may be LOS while others are NLOS; as such, the information associated with these paths should be combined to better localize the target).

Accordingly, to address these issues, the present disclosure proposes using active RF domain repeaters with RSUs for NLOS target detection. An RSU is a computing device located on the roadside that provides connectivity support to passing vehicles. For example, an RSU may be capable of acting as a network edge device for 5.9 GHz DSRC infrastructure. In that role, an RSU facilitates the communication between vehicles and transportation infrastructure and other devices by transferring data over DSRC in accordance with the industry standards. An active radar repeater (or simply "active repeater") as described herein includes an active amplifier to increase the received signal strength of reflected radar signals, thereby addressing the first aspect needed to enable NLOS target detection (i.e., transparent change in signal power). An active repeater is also capable of full duplex communication (i.e., capable of simultaneous reception and transmission). Specifically, an active repeater includes one or more arrays of transmit and receive antennas capable of transmit and receive beamforming, respectively.

Figure 7:
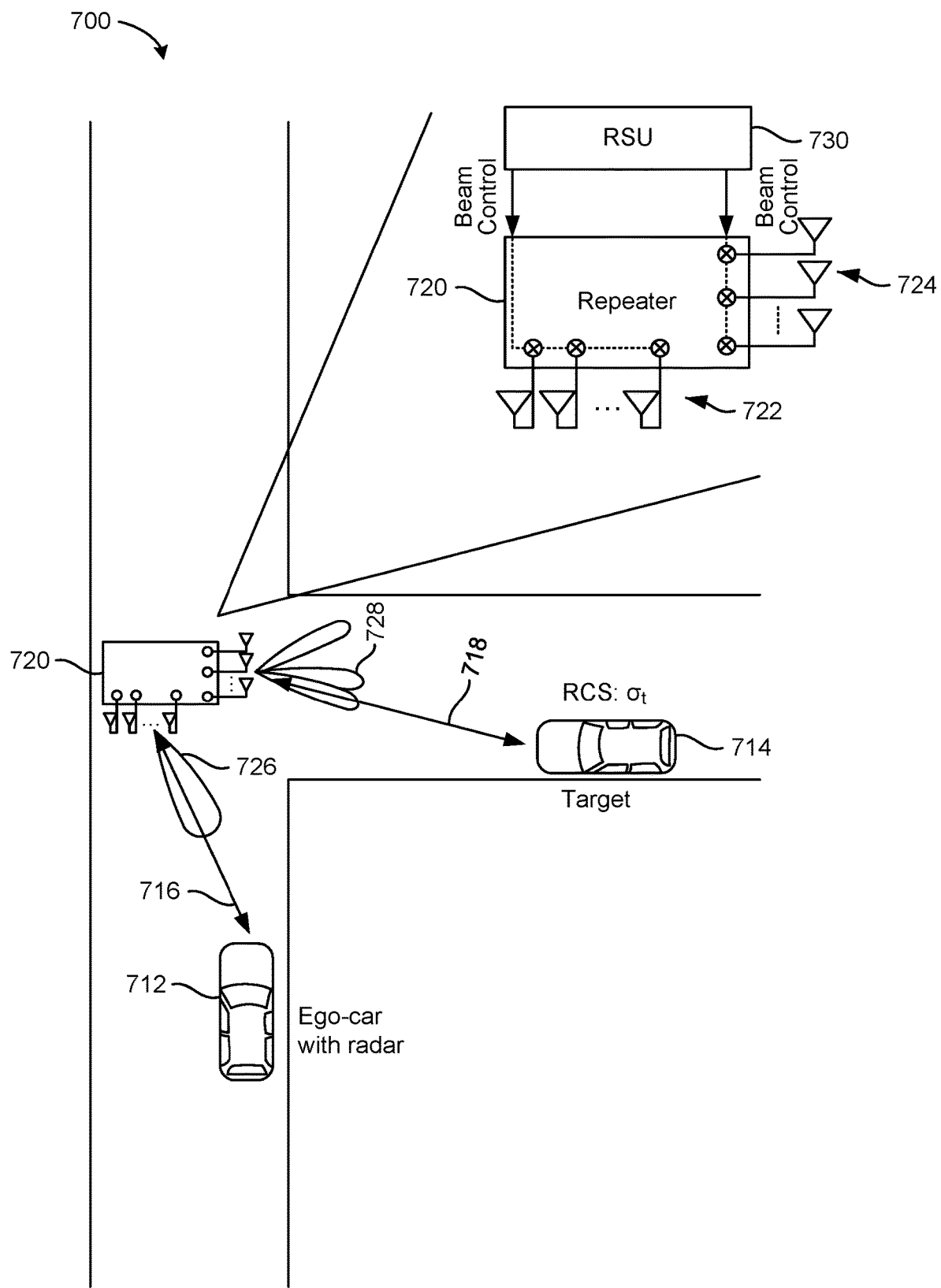
FIG. 7 is a diagram of an example scenario in which a source vehicle and a target vehicle are approaching an intersection equipped with an active repeater, according to aspects of the disclosure.

Transmit/receive beam formation at an active repeater may be controlled by the RSU to ensure the third aspect needed to enable NLOS target detection (i.e., angle information from the repeater to the target) is met. Specifically, as illustrated in FIG. 7, an active repeater may receive beamform on the side of the active repeater facing the source vehicle, and transmit beamform (e.g., beam sweep) on the side of the repeater facing the target vehicle. As described further below, the source vehicle and the RSU may communicate over a vehicle-to-everything (V2X) communication interface to determine the receive and transmit beam directions used by the active repeater. This enables the RSU to determine the angle from the source vehicle to the active repeater and from the active repeater to the target vehicle, thereby meeting the third aspect needed to enable NLOS target detection. In addition, because the RSU knows the directions in which the active repeater is receiving and transmitting, it knows whether or not the path between the source vehicle and the target vehicle is an NLOS path, thereby meeting the second aspect needed to enable NLOS target detection.

FIG. 7 is a diagram 700 of an example scenario in which a source vehicle 712 (which may correspond to source vehicle 612 in FIG. 6) and a target vehicle 714 (which may correspond to target vehicle 614 in FIG. 6) are approaching an intersection equipped with an active repeater 720, according to aspects of the disclosure. The active repeater 720 is capable of receive/transmit beamforming towards the source vehicle 712 and of at least transmit beamforming towards the target vehicle 714. In the example of FIG. 7, the source vehicle 712 is transmitting a radar signal 716 in the direction of the active repeater 720, which receives the radar signal 716 on a receive beam 726 formed by a plurality of antennas 722. A plurality of transmit antennas 724 of the active repeater 720 beam sweep a plurality of transmit beams 728 in an NLOS direction from the source vehicle 712 (here, the direction of a lane perpendicular to the lane in which the source vehicle 712 is travelling) to determine if there are any target vehicles in that direction. In the example of FIG. 7, a particular radar signal 718 of one of the transmit beams 728 reflects off of the target vehicle 714 and is received back at the active repeater 720. The active repeater 720 then repeats the received radar signal 718 back to the source vehicle 712 on (now transmit) beam 726.

An RSU 730 coupled to the active repeater 720 controls the direction of the receive/transmit beam 726 and the transmit beams 728 based on an active communication session (e.g., V2X) between the RSU 730 and the source vehicle 712. In an aspect, as the source vehicle 712 approaches the intersection, it may detect the RSU 730 (based on broadcast messages from the RSU 730) and establish a communication session with it. The messages from the RSU 730 can notify the source vehicle 712 of the location of the RSU 730 and that the RSU 730 can assist the source vehicle 712 in detecting target vehicles in NLOS directions by repeating radar signals from the vehicle 712 in the NLOS directions. The RSU 730 may inform the source vehicle 712 that it is equipped with an active radar repeater, but this is not necessary, and the distinction between the RSU 730 and the active repeater 720 may be transparent to the source vehicle 712. The source vehicle 712 may also inform the RSU 730 of its location to enable the RSU 730 to beamform in the direction of the source vehicle 712.

In an aspect, the RSU 730 may inform the source vehicle 712 that the source vehicle 712 may request NLOS radar data from the RSU 730. The request may identify the NLOS direction(s) from which the source vehicle 712 would like to receive radar data. For example, the source vehicle 712 may recognize that it is approaching a lane perpendicular to the lane in which it is traveling (as in the example of FIG. 7), or it may be behind a truck or other large vehicle that it cannot detect beyond. In that case, the source vehicle 712 may request that the RSU 730 provide radar data for those directions, and the RSU 730 will direct the active repeater 720 to scan in those directions and then send the resulting radar data to the source vehicle 712. More specifically, during a radar scan performed by the source vehicle 712, the active repeater 720 will receive radar signals 716 from the source vehicle 712 on receive beam 726, repeat them in the requested direction(s) (e.g., on transmit beams 728), and provide any received reflections (e.g., radar signal 718) back to the source vehicle 712 on transmit beam 726.

In another aspect, the RSU 730 may provide/broadcast radar data based on a fixed schedule. For example, the RSU 730 may direct the active repeater 720 to scan the north lane, then the east lane, then the south lane, then the west lane, and so on, in a repeating pattern. The RSU 730 can then broadcast the radar data for each lane after the beam sweep for that lane has been performed, or even as it is being performed. The RSU 730 can inform the source vehicle 712 of the scan/broadcast schedule, and the source vehicle 712 can receive the radar data for the NLOS direction(s) in which it is interested during the broadcast time of the radar data for those directions. More specifically, the source vehicle 712 knows the location of the RSU 730/active repeater 720 and therefore knows the range bin in which radar signals reflected off of the RSU 730/active repeater 720 will fall. The source vehicle 712 may also determine the range bin by detecting the RSU 730/active repeater 720 by radar. The source vehicle 712 can then time the start of a radar scan such that the radar data from the RSU 730 is received at the same time as radar signal reflections from targets in the range bin associated with the RSU 730/active repeater 720 would be received.

In an aspect, the source vehicle 712 can request the RSU 730 for a specific persistence time for each scan direction (e.g., to meet the source vehicle's 712 radar performance needs). More specifically, where the source vehicle 712 requests that the RSU 730 scan in a particular direction, the source vehicle 712 can also request that the RSU 730 scan in each direction in which it is interested for at least a specific period of time (e.g., 6 ms). Where the source vehicle 712 simply receives the radar data in which it is interested according to the RSU's 730 schedule, the source vehicle 712 can request that the RSU 730 scan in each direction for the specific amount of time (e.g., 6 ms). The longer the scan in a given direction, the more accurate the object detection in the corresponding radar data can be.

Upon receiving a request to scan for a particular amount of time, the RSU 730 can direct the active repeater 720 to scan for the requested amount of time in all directions (for scheduled scans) or in just the directions that have been requested. If the RSU 730 receives multiple scan length requests from different source vehicles 712 (e.g., a 5 ms request and a 7 ms request) and the active repeater 720 is following a scan schedule, the RSU 730 can direct the active repeater 720 to scan in each direction for the longest period of time requested. If the RSU 730 receives multiple scan length requests and is only directing the active repeater 720 to scan in requested directions, then the RSU 730 can direct the active repeater 720 to scan in the requested directions for the requested amounts of time. In case of an overlap between requested directions (i.e., two vehicles request scans in the same direction), the RSU 730 can direct the active repeater 720 to scan in that direction for the longest requested time.

After a requested or scheduled direction has been scanned, the RSU 730 can provide the raw radar data from the beam sweep of the plurality of transmit beams 728 in that direction to the source vehicle 712, including the direction of each transmit beam 728 relative to the location of the active repeater 720. The radar data should also include the azimuth/elevation angle of each transmit beam 728 in the NLOS direction.

The radar (e.g., radar 414) on the source vehicle 712 combines the received radar data with its own radar data and performs target detection as normal (e.g., as described above with reference to FIG. 5). More specifically, the radar may divide the received radar data into an observation grid (e.g., observation grid 540) comprising a plurality of angle bins (e.g., one angle bin per transmit beam 728 of the beam sweep) and a plurality of range bins (e.g., cells 542). The plurality of range bins would have range values greater than the range values of the range bin associated with the RSU 730/active repeater 720. The radar may associate the angle bin associated with the RSU 730/active repeater 720 (which is known from the location information provided by the RSU 730, and/or the radar detecting the location of the RSU 730/active repeater 720) with this observation grid. The source vehicle 712 can now detect targets in the NLOS direction(s). More specifically, the source vehicle 712 can classify the target(s) (e.g., features 544) detected in the observation grid generated from the radar data received from the RSU 730 (i.e., the plurality of angle bins associated with the angle bin associated with the RSU 730/active repeater 720 and the plurality of range bins greater than the range bin associate with the RSU 730/active repeater 720) as NLOS targets.

In an aspect, the RSU 730 also informs the source vehicle 712 of the group delay associated with the active repeater 720. This allows the source vehicle 712 to cancel out any delay introduced by the active repeater 720 repeating the radar signal 716 on transmit beams 728. The source vehicle 712 will then be able to accurately calculate the range to each NLOS target (e.g., target vehicle 714).

In an aspect, the source vehicle 712 can determine the distance and angle to the target vehicle 714 based on the known location of the RSU 730/active repeater 720 and the angle information from the RSU 730 for each beam of the beam sweep in the NLOS direction(s). More specifically, the source vehicle 712 knows the angle and range values of the feature (e.g., feature 544) corresponding to the target vehicle 714 in the observation grid generated from the radar data received from the RSU 730, the angle between the source vehicle 712 and the RSU 730/active repeater 720, and the known range to the RSU 730/active repeater 720. This information corresponds to the length of two sides of a triangle (from the source vehicle 712 to the RSU 730/active repeater 720, and from the RSU 730/active repeater 720 to the target vehicle 714) and two angles of the triangle (between the source vehicle 712 and the RSU 730/active repeater 720, and between the RSU 730/active repeater 720 and the target vehicle 714). With this information, the source vehicle 712 can calculate the distance and angle from itself to the target vehicle 714.

In an aspect, the RSU 730 may be equipped with full radar capability instead of just repeater capability. In that case, since sharing raw radar data is expensive in terms of bandwidth, the RSU 730 would perform target detection and classification and share only the resulting information about the detected targets (e.g., target vehicle 714) with the source vehicle 712. However, the RSU 730 would need to be able to implement target detection algorithms, which are computationally costly and more power-intensive than simply providing repeater functionality. As such, despite the bandwidth consumption of providing the raw radar data, in order to reduce the complexity and power consumption of the RSU 730, the RSU 730 may simply provide repeater functionality (via the active repeater 720).

In an aspect, the RSU 730 may or may not be co-located with the active repeater 720. For example, a single intersection may have multiple active repeaters 720 associated with a single RSU 730. In that case, rather than providing the source vehicle 712 with the location of the RSU 730, the RSU 730 would provide the location of the appropriate active repeater 720. Where the RSU 730 and the active repeater 720 are co-located, they may be referred to collectively as either an "RSU" or an "active repeater," depending on the context.

As will be appreciated, references in the foregoing to a vehicle (e.g., source vehicle 712) or an RSU (e.g., RSU 730) or an active repeater (e.g., active repeater 720) performing an operation (e.g., detecting, beamforming, transmitting, etc.) should be interpreted as a component of the vehicle, RSU, or active repeater performing the operation. For example, the radar of a vehicle would transmit and receive radar signals, a communication device (e.g., transceiver) of an RSU would communicate with a communication device (e.g., transceiver) of a vehicle, an array of antennas of an active repeater would beamform radar signals, etc.

Figure 8:
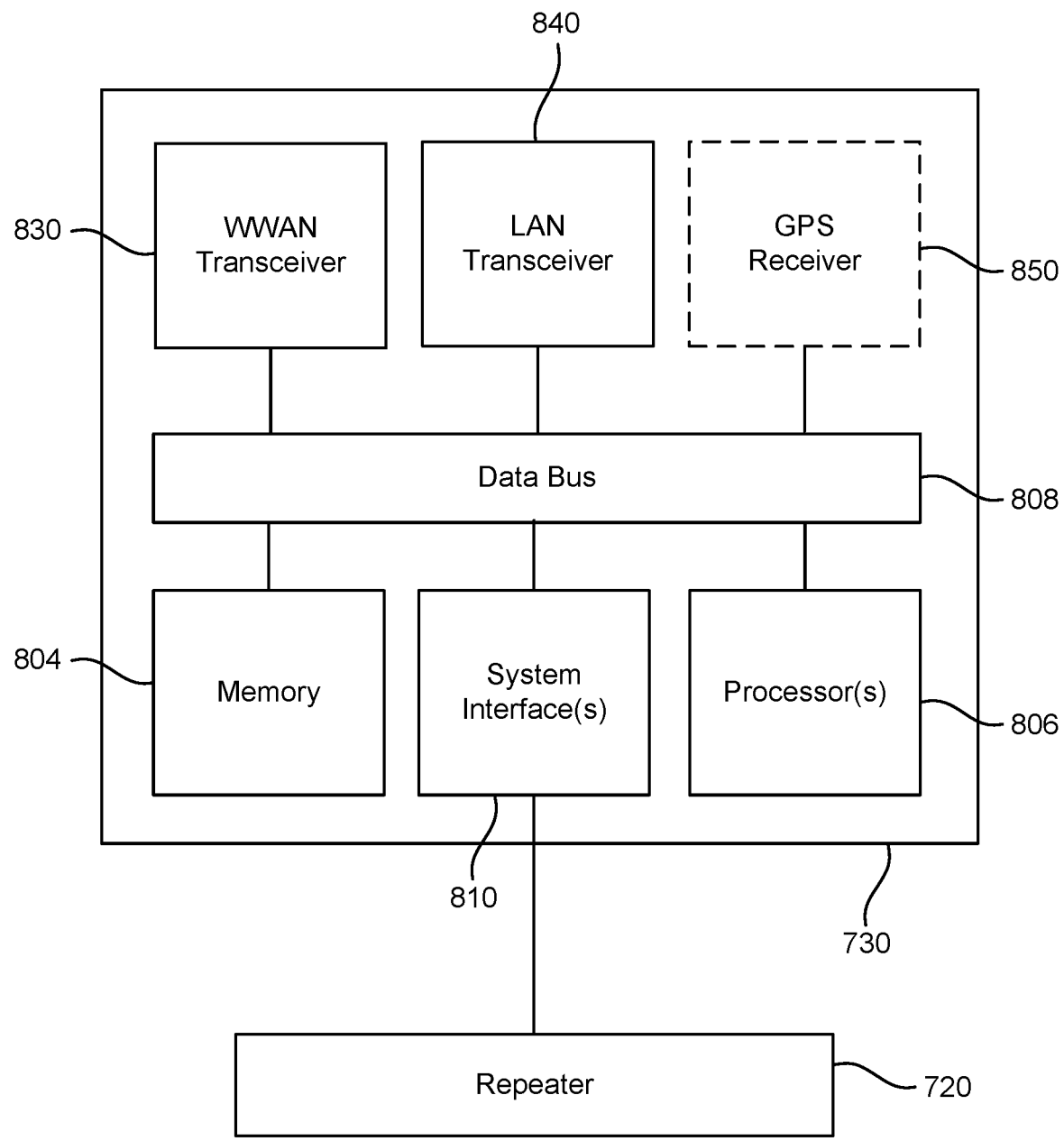
FIG. 8 illustrates a high-level architecture of an example roadside unit (RSU) coupled to an active repeater, according to aspects of the disclosure.

FIG. 8 illustrates a high-level architecture of an example RSU 730 coupled to an active repeater 720, according to aspects of the disclosure. The RSU 730 includes a non-transitory computer-readable storage medium, i.e., memory 804, and one or more processors 806 in communication with the memory 804 via a data bus 808. The memory 804 includes one or more storage modules storing computer-readable instructions executable by the processor(s) 806 to perform the functions of the RSU 730 described herein. The RSU 730 may also include one or more system interfaces 810 connecting the processor(s) 806, by way of the data bus 808, to the repeater 720.

The RSU 730 also includes, at least in some cases, a WWAN transceiver 830 configured to communicate via one or more wireless communication networks (not shown), such as an NR network, an LTE network, a GSM network, and/or the like. The WWAN transceiver 830 may be connected to one or more antennas (not shown) for communicating with other network nodes, such as other RSUs, vehicle UEs, pedestrian UEs, infrastructure access points, base stations (e.g., eNBs, gNBs), etc., via at least one designated RAT (e.g., NR, LTE, GSM, etc.) over a wireless communication medium of interest. The WWAN transceiver 830 may be variously configured for transmitting and encoding signals (e.g., messages, indications, information, and so on), and, conversely, for receiving and decoding signals (e.g., messages, indications, information, pilots, and so on) in accordance with the designated RAT.

The RSU 730 also includes, at least in some cases, a WLAN transceiver 840. The WLAN transceiver 840 may be connected to one or more antennas (not shown) for communicating with other network nodes, such as other RSUs, vehicle UEs, pedestrian UEs, infrastructure access points, etc., via at least one designated RAT (e.g., C-V2X, IEEE 802.11p, DSRC, etc.) over a wireless communication medium of interest. The WLAN transceiver 840 may be variously configured for transmitting and encoding signals (e.g., messages, indications, information, and so on), and, conversely, for receiving and decoding signals (e.g., messages, indications, information, pilots, and so on) in accordance with the designated RAT.

The RSU 730 may also include an optional GPS receiver 850. The GPS receiver 850 may be connected to one or more antennas (not shown) for receiving satellite signals. The GPS receiver 850 may comprise any suitable hardware and/or software for receiving and processing GPS signals. The GPS receiver 850 requests information and operations as appropriate from the other systems, and performs the calculations needed to determine the RSU's 730 position using measurements obtained by any suitable GPS algorithm.

Figure 9:
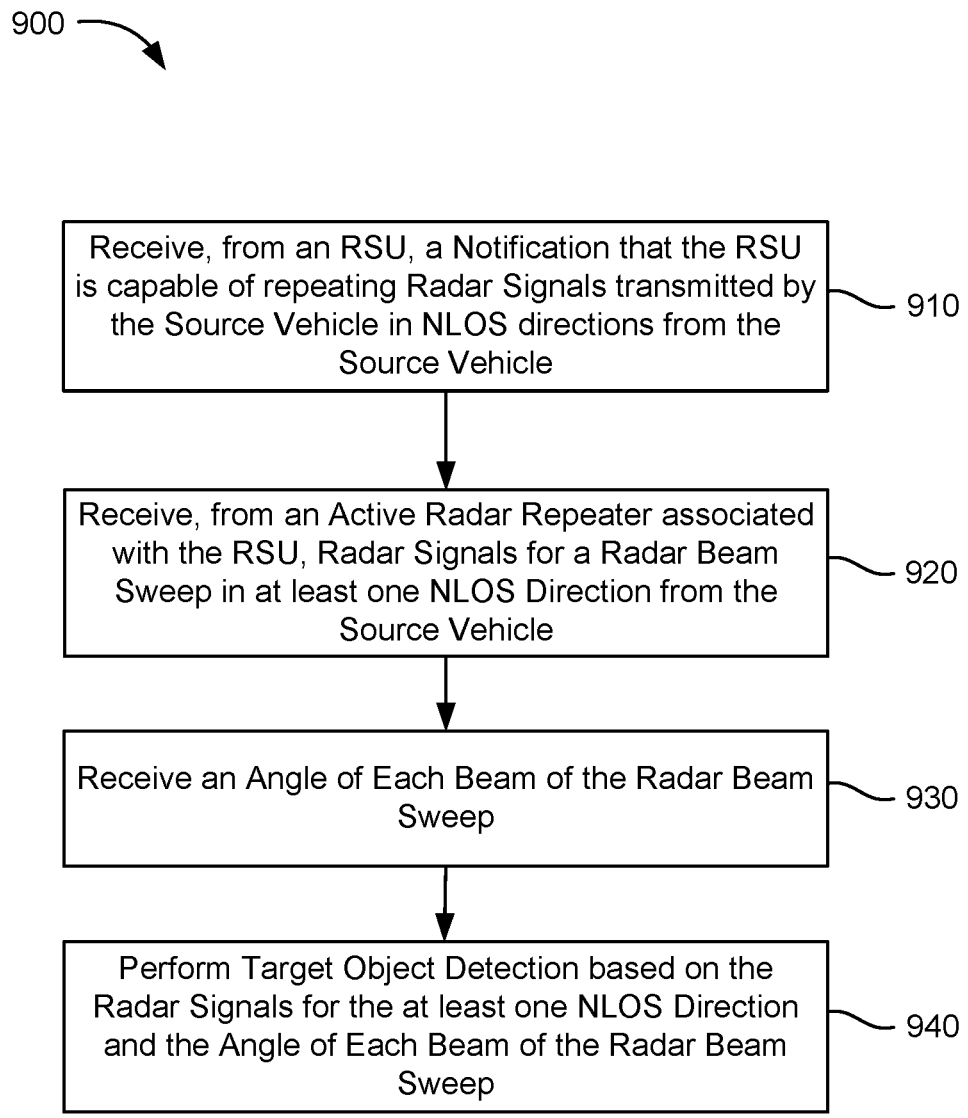
FIGS. 9 and 10 illustrate example methods according to aspects of the disclosure.

FIG. 9 illustrates an example method 900 of NLOS target detection, according to aspects of the disclosure. The method 900 may be performed by a source vehicle, such as source vehicle 612 or 712.

At 910, the source vehicle receives, from an RSU (e.g., RSU 730), a notification that the RSU is capable of repeating radar signals transmitted by the source vehicle in NLOS directions from the source vehicle. In an aspect, operation 910 may be performed by WWAN transceiver 430, WLAN transceiver 440, processor(s) 406, memory 404, and/or radar 414, any or all of which may be considered "means for" performing this operation.

At 920, the source vehicle receives, from an active radar repeater associated with the RSU (e.g., active repeater 720), radar signals (e.g., radar returns or data describing radar returns) for a radar beam sweep in at least one NLOS direction from the source vehicle. In an aspect, operation 920 may be performed by WAN transceiver 430, WLAN transceiver 440, processor(s) 406, memory 404, and/or radar 414, any or all of which may be considered "means for" performing this operation.

At 930, the source vehicle receives (e.g., from the RSU) an angle of each beam of the radar beam sweep. In an aspect, operation 930 may be performed by WAN transceiver 430, WLAN transceiver 440, processor(s) 406, memory 404, and/or radar 414, any or all of which may be considered "means for" performing this operation.

At 940, the source vehicle performs target object detection based on the radar signals for the at least one NLOS direction and the angle of each beam of the radar beam sweep. In an aspect, operation 940 may be performed by processor(s) 406, memory 404, and/or radar 414, any or all of which may be considered "means for" performing this operation.

Figure 10:
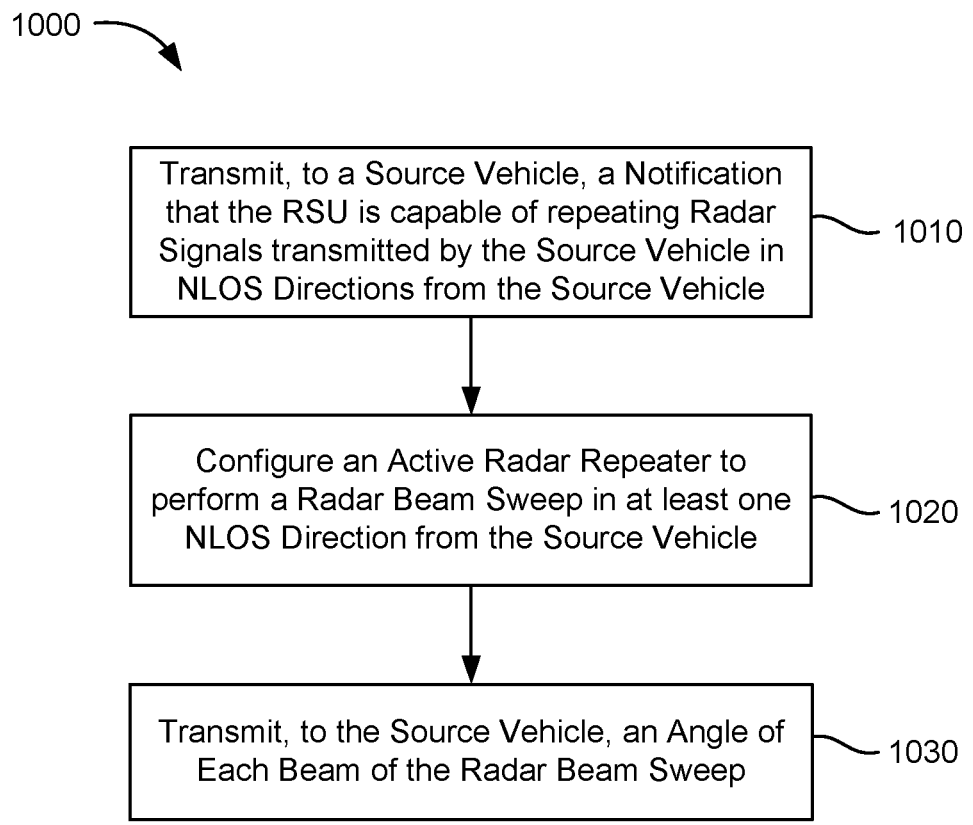

FIG. 10 illustrates an example method 1000 of assisting NLOS target detection, according to aspects of the disclosure. In an aspect, the method 1000 may be performed by an RSU, such as RSU 730.

At 1010, the RSU transmits, to a source vehicle (e.g. source vehicle 612, 712), a notification that the RSU is capable of repeating radar signals transmitted by the source vehicle in NLOS directions from the source vehicle. In an aspect, operation 1010 may be performed by WWAN transceiver 830, WLAN transceiver 840, processor(s) 806, and/or memory 804, any or all of which may be considered "means for" performing this operation.

At 1020, the RSU configures an active radar repeater to perform a radar beam sweep in at least one NLOS direction from the source vehicle. In an aspect, operation 1020 may be performed by WWAN transceiver 830, WLAN transceiver 840, processor(s) 806, and/or memory 804, any or all of which may be considered "means for" performing this operation.

At 1030, the RSU transmits, to the source vehicle, an angle of each beam of the radar beam sweep. In an aspect, operation 1030 may be performed by WWAN transceiver 830, WLAN transceiver 840, processor(s) 806, and/or memory 804, any or all of which may be considered "means for" performing this operation.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The architecture of the active repeater 720 should meet various criteria. First, the active repeater 720 should be capable of single-frequency full duplex operation. That is, the antenna panels of the active repeater 720 should be able to send and receive radar signals on the same frequency at the same time. Second, the radar-serve antenna panel (the antenna panel serving source vehicles 712) should be capable of beamforming some number of beams at the same time (e.g., M=1 or 2), depending on the number of source vehicles 712 the active repeater 720 should be able to serve at the same time. Third, the scan antenna panel (the antenna panel scanning in NLOS directions) should be capable of beamforming one or more beams that can be beam-swept quickly over the entire field of view (FOV) of the antenna panel.

Fourth, as a possible enhancement, the antenna panels may be bi-directional to reduce the number of panels. A bi-directional antenna panel is one that can both scan NLOS directions and serve source vehicles. For example, an active repeater 720 may be equipped with one panel per lane that can both serve source vehicles 712 and scan NLOS directions. In contrast, if the antenna panels are uni-directional, meaning they can only scan or only server, the active repeater 720 will need at least two antenna panels per lane (one for scanning and one for serving).

Figure 11:
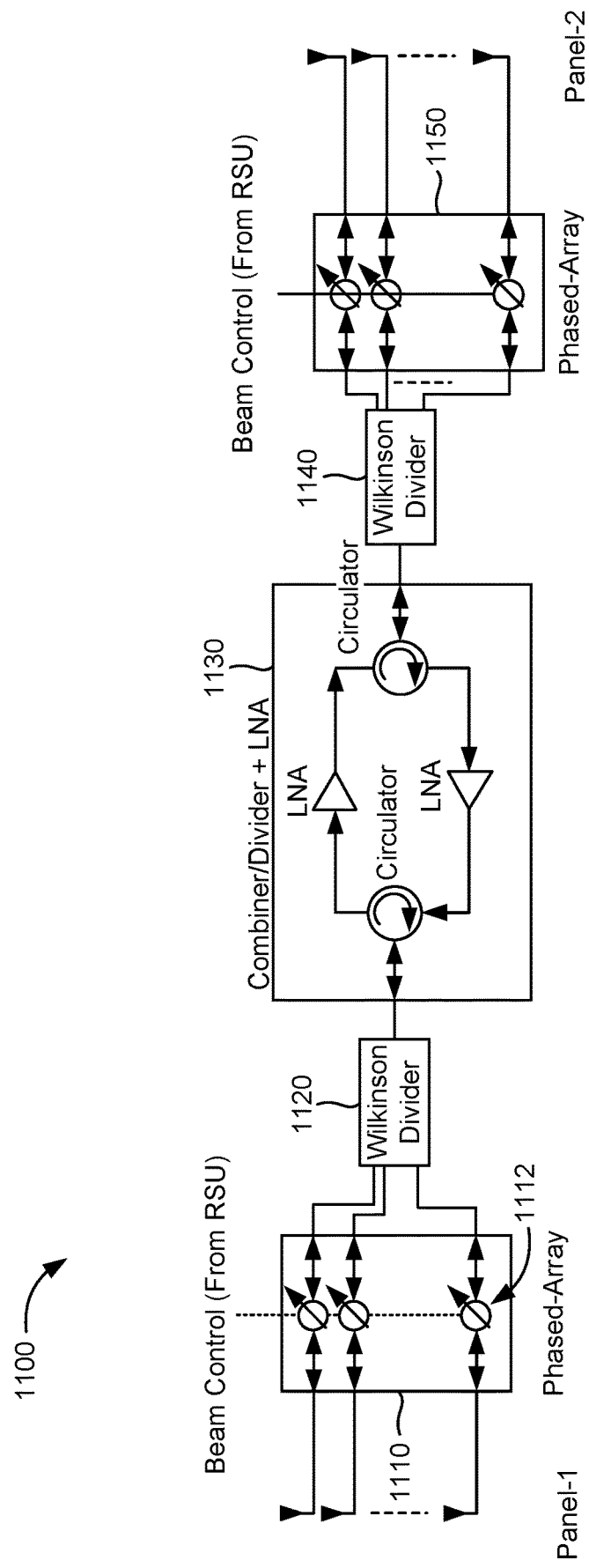
FIGS. 11-13 are diagrams of example architectures for active radar repeaters, according to aspects of the disclosure.

FIG. 11 illustrates an example architecture 1100 of an active repeater, such as active repeater 720, according to aspects of the disclosure. The architecture 1100 is full duplex, thereby meeting the first criteria discussed above. Specifically, for example, antenna panel "Panel-1" may be receiving while antenna panel "Panel-2" may be transmitting, and vice versa. In addition, due to the single phased array per antenna panel, the architecture 1100 can form a single beam on antenna panel Panel-1 and a single beam on antenna panel Panel-2. Note that the beam itself can be multi-modal based on phase combiner weights. Further, because the antenna panels Panel-1 and Panel-2 have the same structure, the antenna panels Panel-1 and Panel-2 are bi-directional, thereby meeting the fourth criteria discussed above. That is, both antenna panels Panel-1 and Panel-2 can both transmit and receive.

In the architecture 1100, the RSU (e.g., RSU 730) controls the two phased arrays that drive the antenna panels Panel-1 and Panel-2. More specifically, phase shifters 1112 (hardware modules that provide a controllable phase shift to an RF signal) controlled by the RSU cause the antenna panels Panel-1 and Panel-2 to beamform and/or beam sweep in the desired direction(s). A low noise amplifier (LNA) adds sufficient gain to compensate for the insertion loss (IL) from antenna panel to antenna panel. IL is the loss of signal power resulting from the insertion of a device in a transmission line, and is usually expressed in decibels (dB). An LNA is an electronic amplifier that amplifies a very low-power signal without significantly degrading its SNR, as opposed to a typical amplifier that increases the power of both the signal and the noise present at its input. Due to the presence of the LNAs, no power amplifier (PA) is needed in the architecture 1100.

In operation, a radar signal from a source vehicle 712 is received at antenna panel Panel-1, for example, on a receive beam formed by the phased array 1110 coupled to antenna panel Panel-1, passed to a Wilkinson divider 1120 (a specific class of power divider circuit that can provide isolation between the output ports while maintaining a matched condition on all ports), circulated through the combiner/divider 1130 where it is amplified by an LNA, passed through another Wilkinson divider 1140 to the phased array 1150 for the antenna panel Panel-2, and then transmitted by the antenna panel Panel-2 on a transmit beam formed by the phased array 1150. The phased array 1150 may cause the antenna panel Panel-2 to perform a beam sweep by sequentially forming multiple transmit beams on the antenna panel Panel-2, each transmit beam focused in a different direction. A radar signal reflected off of a target vehicle 714 is received at antenna panel Panel-2 (optionally on a receive beam formed by the phased array 1150 coupled to antenna panel Panel-2), passed to the Wilkinson divider 1140, circulated through the combiner/divider 1130 where it is amplified by an LNA, passed through the other Wilkinson divider 1120 to the phased array 1110 for the antenna panel Panel-1, and then transmitted by the antenna panel Panel-1 to the source vehicle 712 on a transmit beam formed by the phased array 1110 coupled to the antenna panel Panel-1.

A drawback of the architecture 1100 is that the main use case will be to serve one source vehicle 712 with one radar-serve beam (i.e., M=1) because it can only form one beam in each direction.

Figure 12:
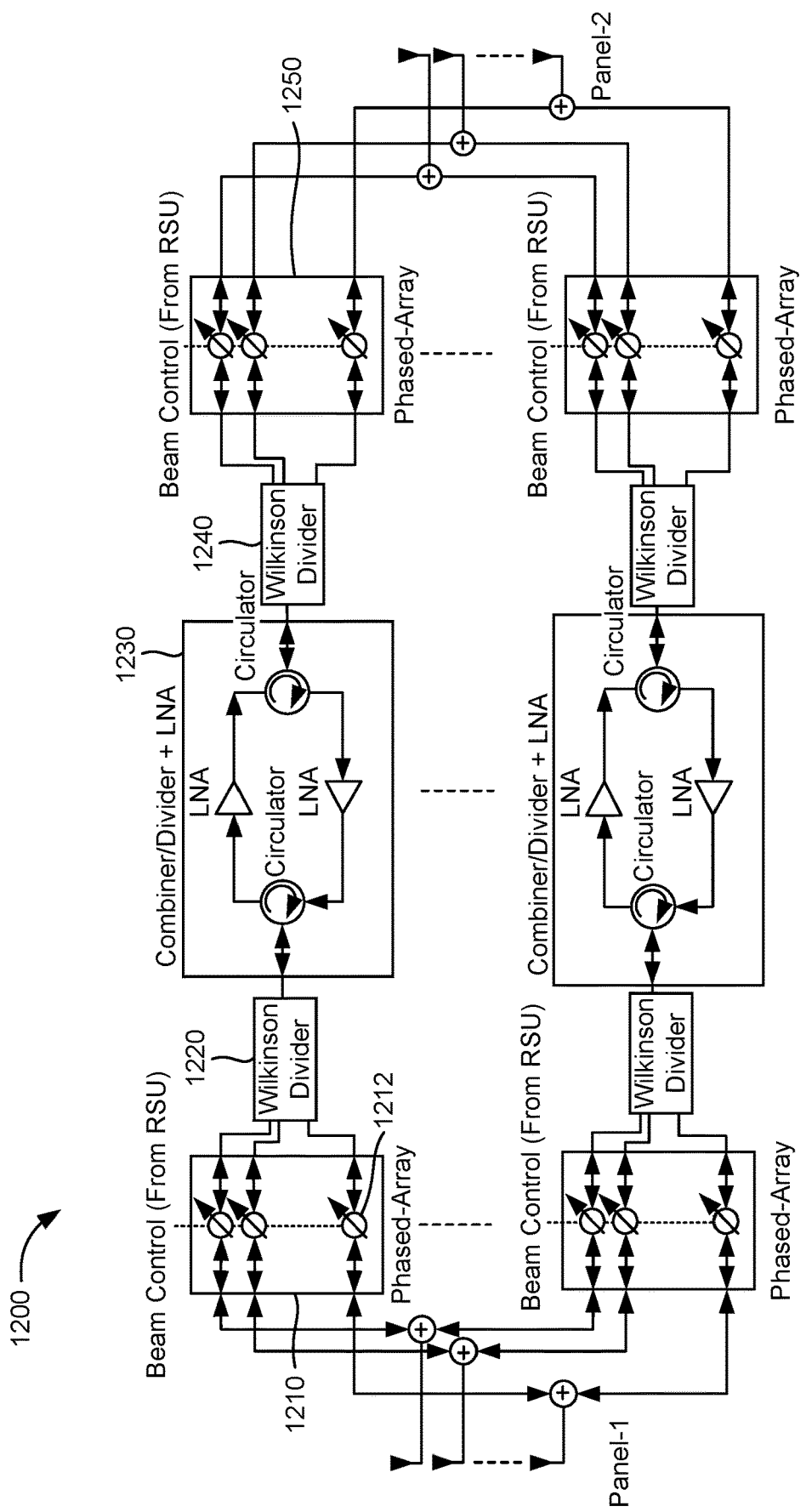

FIG. 12 illustrates an example architecture 1200 of an active repeater, such as active repeater 720, according to aspects of the disclosure. The architecture 1200 is full duplex, thereby meeting the first criteria discussed above. Specifically, as in the architecture 1100, antenna panel "Panel-1" may be receiving while antenna panel "Panel-2" may be transmitting, and vice versa. Further, because the antenna panels Panel-1 and Panel-2 have the same structure, the antenna panels Panel-1 and Panel-2 are bi-directional, thereby meeting the fourth criteria discussed above. That is, both antenna panels Panel-1 and Panel-2 can both transmit and receive.

In addition, the architecture 1200 is capable of forming multiple beams on antenna panels Panel-1 and Panel-2, due to the multiple (e.g., M) phased arrays and combiner/dividers coupled to each antenna panel. That is, each phased array can form a separate beam that is fed to a respective antenna panel, Panel-1 or Panel-2. Thus, each antenna panel may create as many beams as there are phased arrays, and therefore, may simultaneously serve as many source vehicles 712 and perform as many radar scans as there are phased arrays. In addition, each beam can have a different gain so that a certain radar-serve beam would match a certain radar scan beam (or beam sweep).

In the architecture 1200, as in the architecture 1100, the RSU (e.g., RSU 730) controls the M phased arrays that drive the antenna panels Panel-1 and Panel-2. More specifically, phase shifters 1212 controlled by the RSU cause the antenna panels Panel-1 and Panel-2 to beamform and/or beam sweep in the desired direction(s). An LNA adds sufficient gain to compensate for the IL from antenna panel to antenna panel. Note that, like the architecture 1100, no PA is needed in the architecture 1200. Thus, as can be seen, the architecture 1200 replicates the architecture 1100 M times, except that there are still only two antenna panels.

In operation, a radar signal from a source vehicle 712 is received at antenna panel Panel-1, for example, on a receive beam formed by the phased array 1210 coupled to antenna panel Panel-1, passed to the Wilkinson divider 1220 coupled to the phased array 1210, circulated through the combiner/divider 1230 coupled to the Wilkinson divider 1220, passed through another Wilkinson divider 1240 to the corresponding phased array 1250 for the antenna panel Panel-2, and then transmitted by the antenna panel Panel-2 on a plurality of transmit beams formed by the phased array 1250. The phased array 1250 may cause the antenna panel Panel-2 to perform a beam sweep by sequentially forming multiple transmit beams on the antenna panel Panel-2, each transmit beam focused in a different direction. A radar signal reflected off of a target vehicle 714 is received at antenna panel Panel-2 (optionally on a receive beam formed by the phased array 1250), passed to the Wilkinson divider 1240 coupled to the phased array 1250 that formed the transmit beam for the reflected radar signal, circulated through the combiner/divider 1230, passed through the other Wilkinson divider 1220 to the phased array 1210 for the antenna panel Panel-1, and then transmitted by the antenna panel Panel-1 to the source vehicle 712 on a transmit beam formed by the phased array 1210 coupled to the antenna panel Panel-1.

A drawback of the architecture 1200 is that N phase shifters 1212 are needed for N beams, for a total of N×M phase shifters 1212 for each antenna panel. This may be acceptable for small values of M (e.g., M=1, 2), but as M grows (e.g., if M=N), this will become very complex.

Figure 13:
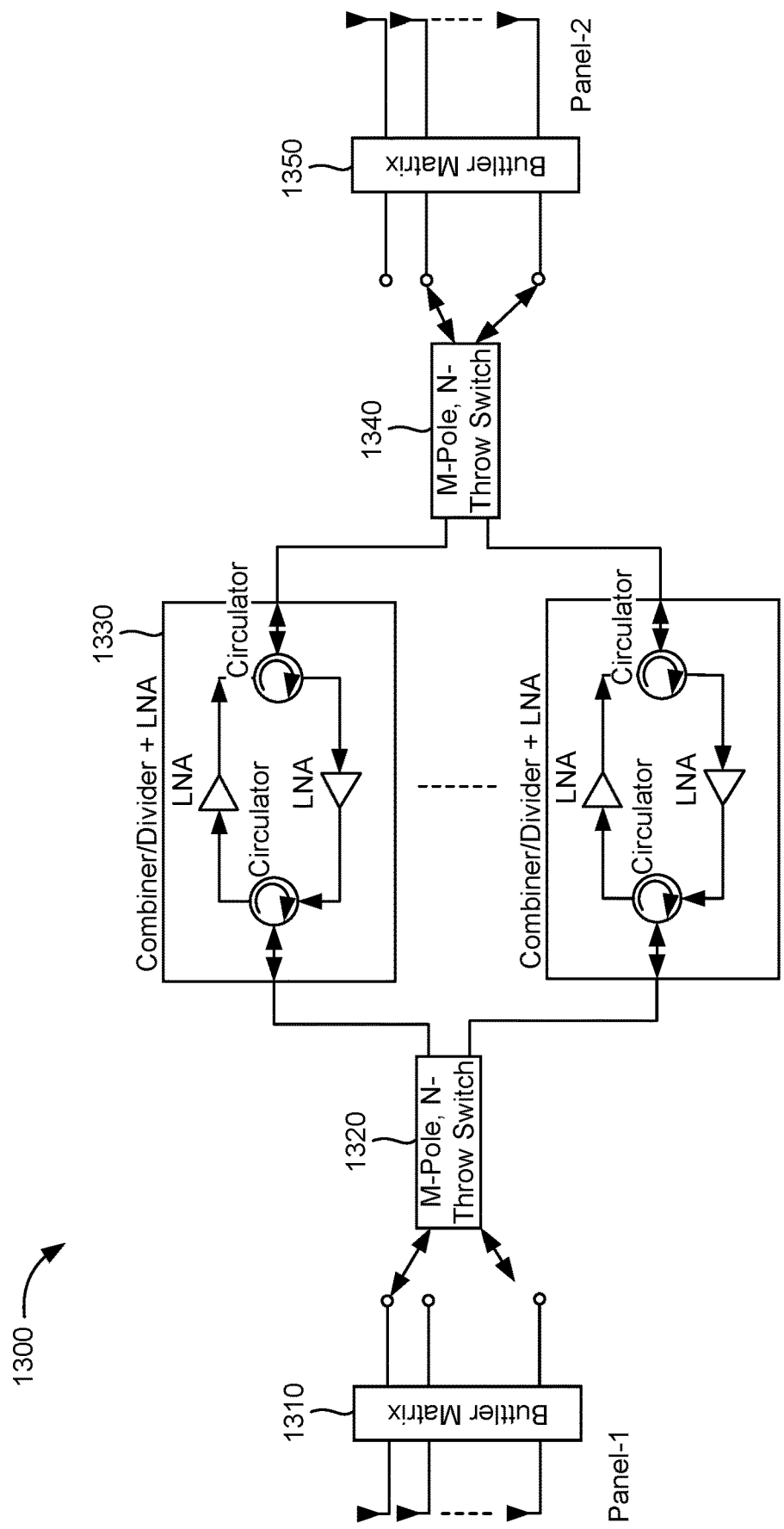

FIG. 13 illustrates an example architecture 1300 of an active repeater, such as active repeater 720, according to aspects of the disclosure. The architecture 1300 is full duplex, thereby meeting the first criteria discussed above. Specifically, as in the architecture 1200, antenna panel "Panel-1" may be receiving while antenna panel "Panel-2" may be transmitting, and vice versa. Further, because the antenna panels Panel-1 and Panel-2 have the same structure, the antenna panels Panel-1 and Panel-2 are bi-directional, thereby meeting the fourth criteria discussed above. That is, both antenna panels Panel-1 and Panel-2 can both transmit and receive.

Figure 14:
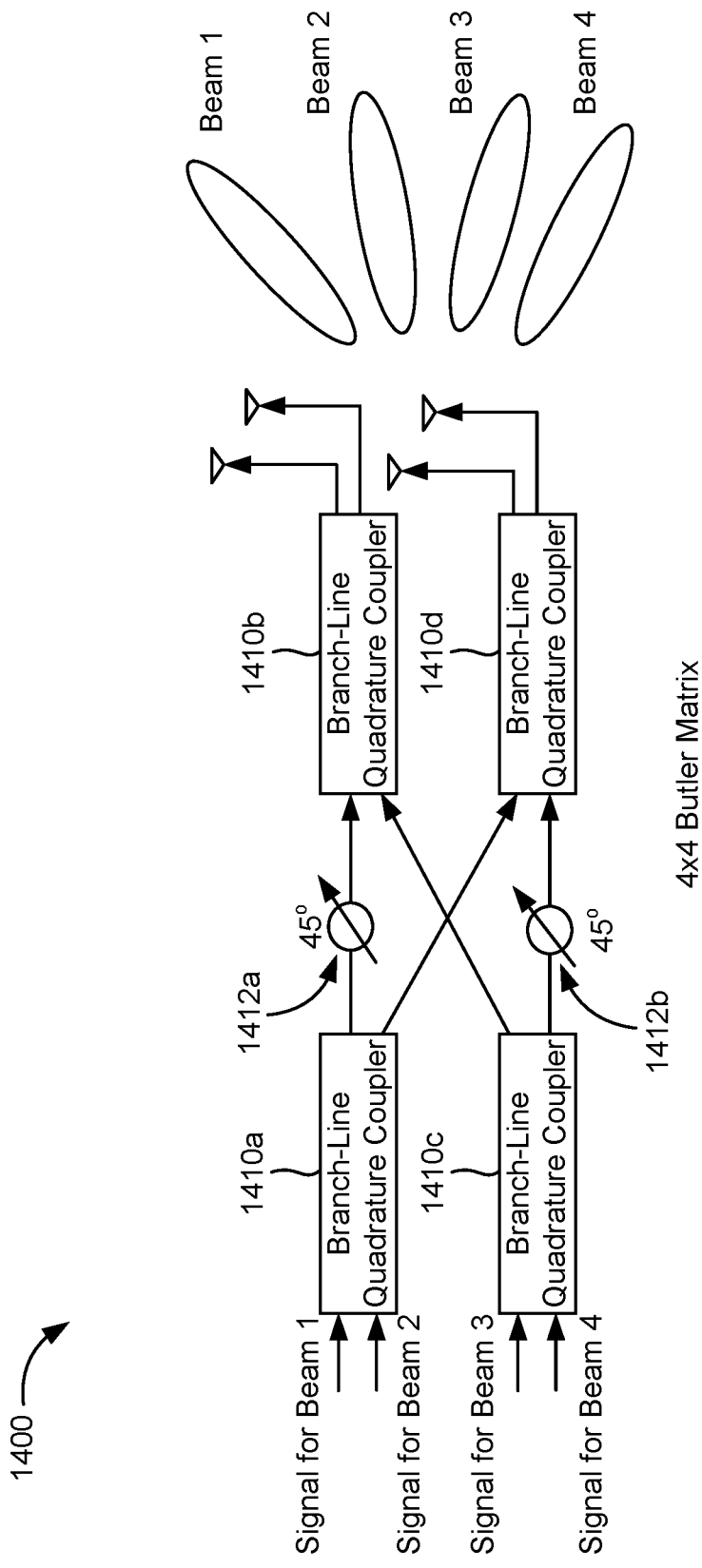
FIG. 14 is a diagram of a Butler matrix, according to aspects of the disclosure.

In the architecture 1300, instead of an array of phase shifters, as in architectures 1100 and 1200, a Butler matrix (e.g., Butler matrix 1310/1350) is used to form the beams on the antenna elements of antenna panels Panel-1 and Panel-2. As illustrated in FIG. 14, a Butler matrix consists of an N×N matrix of quadrature couplers 1410 and fixed-value phase shifters 1412, where N is some power of 2 (N=4 in the example of FIG. 14). To form N beams, a Butler matrix needs (N/2) log 2(N) quadrature couplers (e.g., branch-line couplers). Thus, in the example of FIG. 14, there are four quadrature couplers 1410 for N=4 beams.

A Butler matrix module has N input ports (referred to as "beam ports") to which power is applied, and N output ports to which N antenna elements of the antenna panel (e.g., antenna panel Panel-1) are connected. The Butler matrix feeds power to the N antenna elements with a progressive phase difference between antenna elements such that the resulting beam from an antenna element is in the desired direction.

In operation, in the example of FIG. 14, when power is applied to the beam port for a first beam ("beam 1") of the N=4 beams, the quadrature coupler 1410a passes the signal through a phase shifter 1412a to the quadrature coupler 1410b, which outputs the signal as a beam on the corresponding antenna element. When power is applied to the beam port for a second beam ("beam 2") of the N=4 beams, the quadrature coupler 1410a passes the signal to the quadrature coupler 1410d, which outputs the signal as a beam on the corresponding antenna element. Similarly, when power is applied to the beam port for a third beam ("beam 3") of the N=4 beams, the quadrature coupler 1410*c* passes the signal to the quadrature coupler 1410*b*, which outputs the signal as a beam on the corresponding antenna element. When power is applied to the beam port for a fourth beam ("beam 4") of the N=4 beams, the quadrature coupler 1410*b* passes the signal through a phase shifter 1412*b* to the quadrature coupler 1410*d*, which outputs the signal as a beam on the corresponding antenna element.

Referring again to the architecture 1300, the N input ports of each Butler matrix (e.g., Butler matrix 1310/1350) are coupled to the N output ports of an M-pole N-throw switch (e.g., M-pole N-throw switch 1320/1340). The RSU 730 controls the beam direction by sending power to the desired beam port(s) of each Butler matrix via the M-pole N-throw switch coupled to that Butler matrix. The M-pole N-throw switch allows the RSU 730 to select up to M beams out of the total of N beams that can be formed. For example, there may be N=50 antenna elements per antenna panel, but M may equal 10. As such, the RSU 730 can select up to 10 beams to be transmitted simultaneously. Note that in the architecture 1300, M is the number of signal combiner/dividers (e.g., signal combiner/divider 1330). Thus, the number of simultaneous beams supported by the architecture 1300 depends on the number of combiner/dividers.

An LNA in the signal combiner/dividers (e.g., signal combiner/divider 1330) adds sufficient gain to compensate for the IL from antenna panel to antenna panel. Note that, like the architectures 1100 and 1200, no PA is needed in the architecture 1200. The architecture 1300 intentionally aims to not share the same scan beam.

Specifically, the M-pole N-throw switches (e.g., M-pole N-throw switch 1320/1340) prevent the same scan beam from being selected for different serve beams. That is, an M-pole N-throw switch cannot provide two outputs to the same input port on a Butler matrix. In this way, different antenna elements are scanning in different directions at the same time, which helps to avoid cross-radar interference.

As will be appreciated, because N×M phase shifters are used in the architecture 1200, whereas a Butler matrix forms N beams with (N/2) log 2(N) quadrature couplers, as M grows, the architecture 1300 becomes a more attractive option.

Figure 15:
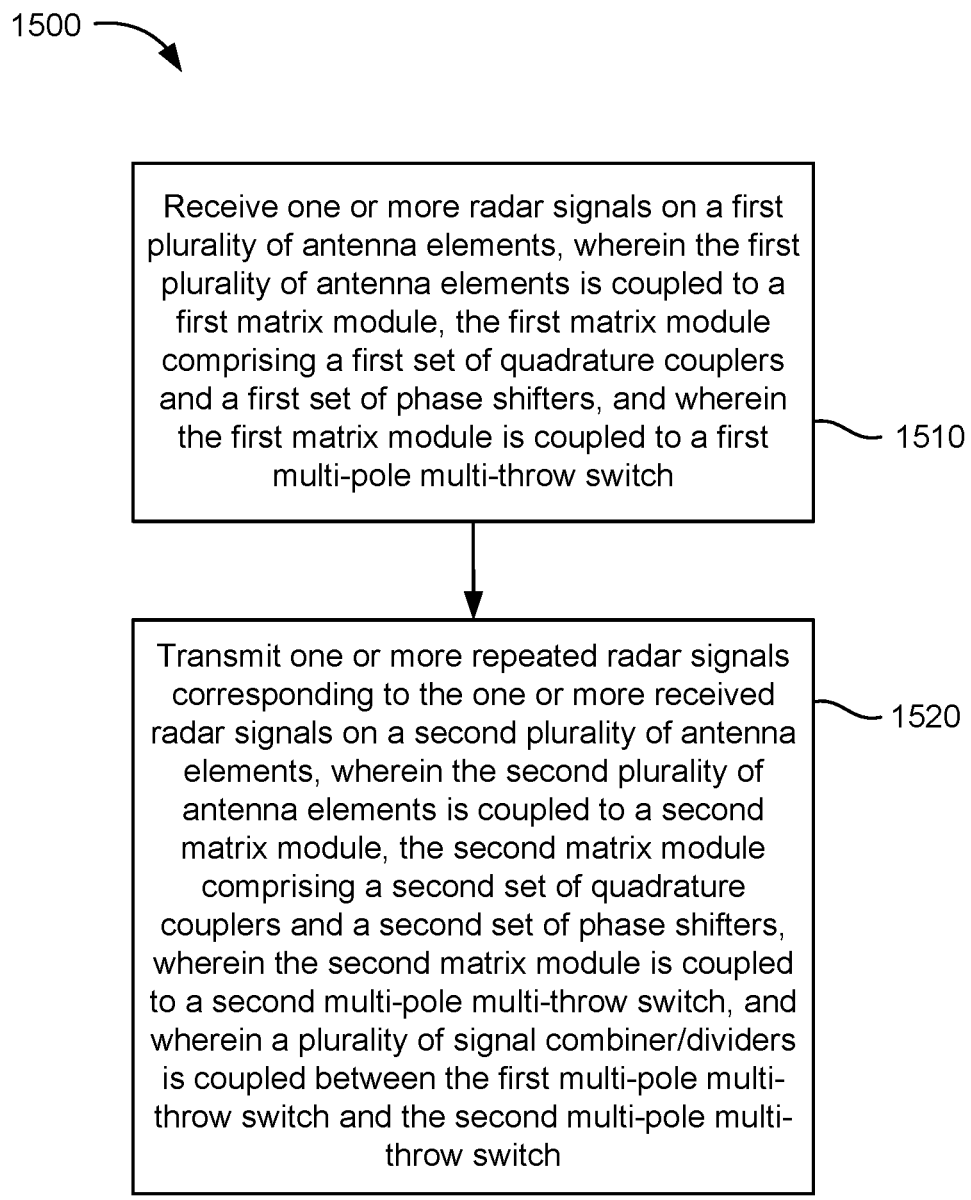
FIGS. 15 and 16 illustrate example methods for repeating a radar signal.

FIG. 15 illustrates an example method 1500 for repeating a radar signal. In an aspect, the method 1500 may be performed by a radar repeater, such as architecture 1300 in FIG. 13.

At 1510, the radar repeater receives one or more radar signals on a first plurality of antenna elements, wherein the first plurality of antenna elements is coupled to a first matrix module, the first matrix module comprising a first set of quadrature couplers and a first set of phase shifters, and wherein the first matrix module is coupled to a first multi-pole multi-throw switch.

At 1520, the radar repeater transmits one or more repeated radar signals corresponding to the one or more received radar signals on a second plurality of antenna elements, wherein the second plurality of antenna elements is coupled to a second matrix module, the second matrix module comprising a second set of quadrature couplers and a second set of phase shifters, wherein the second matrix module is coupled to a second multi-pole multi-throw switch, and wherein a plurality of signal combiner/dividers is coupled between the first multi-pole multi-throw switch and the second multi-pole multi-throw switch.

In an aspect, the method 1500 further includes (not shown) receiving, from an RSU (e.g., any of the RSUs described herein), a selection of a subset of the first plurality of antenna elements via the first multi-pole multi-throw switch and a subset of the second plurality of antenna elements via the second multi-pole multi-throw switch.

Figure 16:
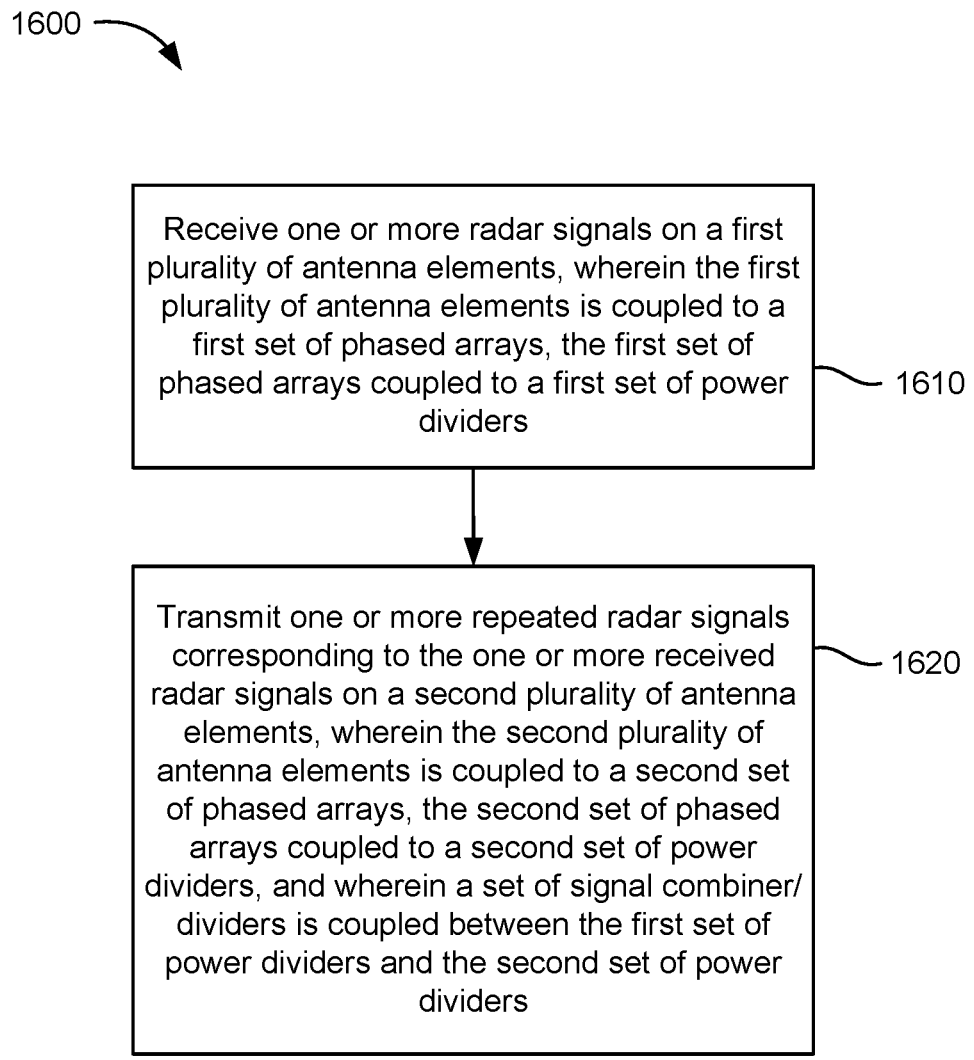

FIG. 16 illustrates an example method 1600 for repeating a radar signal. In an aspect, the method 1600 may be performed by a radar repeater, such as architecture 1100 in FIG. 11 or architecture 1200 in FIG. 12.

At 1610, the radar repeater receives one or more radar signals on a first plurality of antenna elements, wherein the first plurality of antenna elements is coupled to a first set of phased arrays, the first set of phased arrays coupled to a first set of power dividers.

At 1620, the radar repeater transmits one or more repeated radar signals corresponding to the one or more received radar signals on a second plurality of antenna elements, wherein the second plurality of antenna elements is coupled to a second set of phased arrays, the second set of phased arrays coupled to a second set of power dividers, and wherein a set of signal combiner/dividers is coupled between the first set of power dividers and the second set of power dividers.

In an aspect, the method 1600 further includes (not shown) receiving, from an RSU (e.g., any of the RSUs described herein), a selection of a subset of the first plurality of antenna elements via the first set of phased arrays and a subset of the second plurality of antenna elements via the second set of phased arrays.

In the detailed description above it can be seen that different features are grouped together in examples. This manner of disclosure should not be understood as an intention that the claimed examples have more features than are explicitly mentioned in each claim. Rather, the various aspects of the disclosure may include fewer than all features of an individual example disclosed. Therefore, the following claims should hereby be deemed to be incorporated in the description, wherein each claim by itself can stand as a separate example. Although each dependent claim can refer in the claims to a specific combination with one of the other claims, the aspect(s) of that dependent claim are not limited to the specific combination. It will be appreciated that other examples can also include a combination of the dependent claim aspect(s) with the subject matter of any other dependent claim or independent claim or a combination of any feature with other dependent and independent claims. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a claim can be included in any other independent claim, even if the claim is not directly dependent on the independent claim.

For example, further aspects may include one or more of the following features discussed in the various example aspects.

Example 1: A method of non-line-of-sight (NLOS) target detection performed by a source vehicle, comprising: receiving, from a roadside unit (RSU), a notification that the RSU is capable of repeating radar signals transmitted by the source vehicle in NLOS directions from the source vehicle; receiving, from an active radar repeater associated with the RSU, radar signals (e.g., radar returns or data describing radar returns) for a radar beam sweep in at least one NLOS direction from the source vehicle; receiving an angle of each beam of the radar beam sweep; and performing target object detection based on the radar signals for the at least one NLOS direction and the angle of each beam of the radar beam sweep.

Example 2: The method of example 1, wherein the performing the target object detection comprises: identifying any target objects detected in a group of angles associated with the active radar repeater, and in a group of ranges greater than a group of ranges associated with the active radar repeater, as NLOS target objects.

Example 3: The method of example 2, wherein the identifying comprises: generating an observation grid from the radar signals, the observation grid representing a plurality of groups of angles and a plurality of groups of ranges, each of the plurality of groups of angles corresponding to an angle of a beam of the radar beam sweep, each of the plurality of groups of ranges greater than the group of ranges associated with the active radar repeater, wherein the plurality of groups of angles are associated with the group of angles associated with the active radar repeater; and identifying any target objects detected in the plurality of groups of angles and the plurality of groups of ranges as NLOS target objects.

Example 4: The method of example 3, further comprising: detecting at least one NLOS target object based on the target object detection; and determining an angle between the source vehicle and the at least one NLOS target object based on an angle between the source vehicle and the active radar repeater, an angle between the active radar repeater and the at least one NLOS target object, a distance between the source vehicle and the active radar repeater, and a distance between the active radar repeater and the at least one NLOS target object.

Example 5: The method of Example 4, wherein: the angle between the source vehicle and the active radar repeater is based on a location of the active radar repeater, the angle between the active radar repeater and the at least one NLOS target object is based on a group of angles of the plurality of groups of angles in which the at least one NLOS target object is detected, the distance between the source vehicle and the active radar repeater is based on the group of ranges associated with the active radar repeater, and/or the distance between the active radar repeater and the at least one NLOS target object is based on a group of ranges of the plurality of groups of ranges in which the at least one NLOS target object is detected.

Example 6: The method of example 3, wherein the plurality of groups of angles correspond to groups of azimuth angles and/or elevation angles.

Example 7: The method of example 3, further comprising: receiving, from the RSU, a group delay of the active radar repeater, wherein the plurality of groups of ranges are determined based on the group delay.

Example 8: The method of example 1, further comprising: receiving, from the RSU, a location of the active radar repeater.

Example 9: The method of example 8, wherein the active radar repeater is co-located with the RSU.

Example 10: The method of example 8, wherein the active radar repeater is not co-located with the RSU.

Example 11: The method of example 1, further comprising: transmitting, to the RSU, a request to perform the radar beam sweep in the at least one NLOS direction.

Example 12: The method of example 11, wherein the request includes a length of time to perform the radar beam sweep in the at least one NLOS direction.

Example 13: The method of example 1, further comprising: receiving, from the RSU, an indication of a scheduled time at which the radar beam sweep in the at least one NLOS direction will be performed Example 14: The method of example 1, further comprising: transmitting, to the RSU, a length of time to perform the radar beam sweep in the at least one NLOS direction.

Example 15: The method of example 1, wherein the RSU and the source vehicle communicate over a vehicle-to-everything (V2X) communication interface.

Example 16: A method of assisting non-line-of-sight (NLOS) target detection performed by a roadside unit (RSU), comprising: transmitting, to a source vehicle, a notification that the RSU is capable of repeating radar signals transmitted by the source vehicle in NLOS directions from the source vehicle; configuring an active radar repeater to perform a radar beam sweep in at least one NLOS direction from the source vehicle; and transmitting, to the source vehicle, an angle of each beam of the radar beam sweep.

Example 17: The method of example 16, further comprising: transmitting, to the source vehicle, a location of the active radar repeater.

Example 18: The method of example 17, wherein the active radar repeater is co-located with the RSU, Example 19: The method of example 17, wherein the active radar repeater is not co-located with the RSU.

Example 20: The method of example 16, further comprising: receiving, from the source vehicle, a request to perform the radar beam sweep in the at least one NLOS direction.

Example 21: The method of example 20, wherein the request includes a length of time to perform the radar beam sweep in the at least one NLOS direction.

Example 22: The method of example 21, further comprising: configuring the active radar repeater to perform the radar beam sweep in the at least one NLOS direction for the requested length of time.

Example 23: The method of example 16, further comprising: transmitting, to the source vehicle, an indication of a scheduled time at which the radar beam sweep in the at least one NLOS direction will be performed.

Example 24: The method of example 23, further comprising: receiving, from the source vehicle, a length of time to perform the radar beam sweep in the at least one NLOS direction.

Example 25: The method of example 24, further comprising: configuring the active radar repeater to perform the radar beam sweep in the at least one NLOS direction for the requested length of time.

Example 26: The method of example 16, further comprising: configuring the active radar repeater to perform a beam sweep in each of a plurality of directions, wherein each of the plurality of directions corresponds to a lane of a roadway.

Example 27: The method of example 16, further comprising: transmitting, to the source vehicle, a group delay of the active radar repeater, wherein the plurality of groups of ranges are determined based on the group delay.

Example 28: The method of example 16, further comprising: receiving, from the source vehicle, a location of the source vehicle.

Example 29: The method of example 28, further comprising: configuring the active radar repeater to beamform in a direction of the location of the source vehicle.

Example 30: The method of example 16, wherein the RSU and the source vehicle communicate over a vehicle-to-everything (V2X) communication interface.

Example 31: An apparatus for repeating a radar signal, comprising: a first plurality of antenna elements; a second plurality of antenna elements; a first matrix module coupled to the first plurality of antenna elements, the first matrix module comprising a first set of quadrature couplers and a first set of phase shifters; a second matrix module coupled to the second plurality of antenna elements, the second matrix module comprising a second set of quadrature couplers and a second set of phase shifters; a first multi-pole multi-throw switch coupled to the first matrix module; a second multi-pole multi-throw switch coupled to the second matrix module; and a plurality of signal combiner/dividers coupled between the first multi-pole multi-throw switch and the second multi-pole multi-throw switch.

Example 32: The apparatus of example 31, wherein: a roadside unit (RSU) coupled to the first multi-pole multi-throw switch and the second multi-pole multi-throw switch.

Example 33: The apparatus of example 32, wherein the RSU is configured to select a subset of the first plurality of antenna elements via the first multi-pole multi-throw switch and a subset of the second plurality of antenna elements via the second multi-pole multi-throw switch.

Example 34: The apparatus of example 31, each of the first plurality of antenna elements and the second plurality of antenna elements is configured to beamform in a different direction.

Example 35: The apparatus of example 31, wherein: the first matrix module being coupled to the first plurality of antenna elements comprises a plurality of output ports of the first matrix module being coupled to the first plurality of antenna elements, and a number of the plurality of output ports is the same as a number of the first plurality of antenna elements, and each port of the plurality of output ports is coupled to a different antenna element of the first plurality of antenna elements.

Example 36: The apparatus of example 31, wherein: the second matrix module being coupled to the second plurality of antenna elements comprises a plurality of output ports of the second matrix module being coupled to the second plurality of antenna elements, and a number of the plurality of output ports is the same as a number of the second plurality of antenna elements, and each port of the plurality of output ports is coupled to a different antenna element of the second plurality of antenna elements.

Example 37: The apparatus of example 31, wherein: the first multi-pole multi-throw switch being coupled to the first matrix module comprises a plurality of throw ports of the first multi-pole multi-throw switch being coupled to a plurality of input ports of the first matrix module, and the second multi-pole multi-throw switch being coupled to the second matrix module comprises a plurality of throw ports of the second multi-pole multi-throw switch being coupled to a plurality of input ports of the second matrix module.

Example 38: The apparatus of example 31, wherein the plurality of signal combiner/dividers being coupled between the first multi-pole multi-throw switch and the second multi-pole multi-throw switch comprises: each pole port of a plurality of pole ports of the first multi-pole multi-throw switch being coupled to a different one of the plurality of signal combiner/dividers, and each pole port of a plurality of pole ports of the second multi-pole multi-throw switch being coupled to a different one of the plurality of signal combiner/dividers.

Example 39: The apparatus of example 31, wherein each of the plurality of signal combiner/dividers comprises a plurality of low noise amplifiers and a plurality of circulators.

Example 40: The apparatus of example 39, wherein each of the plurality of signal combiner/dividers comprises two low noise amplifiers and two circulators.

Example 41: The apparatus of example 31, wherein: the first matrix module comprises a first Butler matrix module, and the second matrix module comprises a second Butler matrix module.

Example 42: The apparatus of example 31, wherein: the first multi-pole multi-throw switch is a first M-pole N-throw switch, the second multi-pole multi-throw switch is a second M-pole N-throw switch, M is a number of the plurality of signal combiner/dividers, and N is a number of the first plurality of antenna elements.

Example 43: An apparatus for repeating a radar signal, comprising: a first plurality of antenna elements; a second plurality of antenna elements; a first set of phased arrays coupled to the first plurality of antenna elements; a second set of phased arrays coupled to the second plurality of antenna elements; a first set of power dividers coupled to the first set of phased arrays; a second set of power dividers coupled to the second set of phased arrays; and a set of signal combiner/dividers coupled between the first set of power dividers and the second set of power dividers.

Example 44: The apparatus of example 43, wherein a roadside unit (RSU) is coupled to the first set of phased arrays and the second set of phased arrays.

Example 45: The apparatus of example 43, wherein the RSU is configured to select a subset of the first plurality of antenna elements via the first set of phased arrays and a subset of the second plurality of antenna elements via the second set of phased arrays.

Example 46: The apparatus of example 43, wherein each of the first set of antenna elements and the second set of antenna elements is configured to beamform in a different direction.

Example 47: The apparatus of example 43, wherein: the first set of phased arrays being coupled to the first plurality of antenna elements comprises each phase shifter of a plurality of phase shifters of each phased array of the first set of phased arrays being coupled to a different antenna element of the first plurality of antenna elements, and a number of the plurality of phase shifters of each phased array of the first set of phased arrays is the same as a number of the first plurality of antenna elements, Example 48: The apparatus of example 47, wherein: the second set of phased arrays being coupled to the second plurality of antenna elements comprises each phase shifter of a plurality of phase shifters of each phased array of the second set of phased arrays being coupled to a different antenna element of the second plurality of antenna elements, and a number of the plurality of phase shifters of each phased array of the second set of phased arrays is the same as a number of the second plurality of antenna elements.

Example 49: The apparatus of example 43, wherein: the first set of phased arrays and the second set of phased arrays each include only one phased array, the first set of power dividers and the second set of power dividers each include only one power divider, and the set of signal combiner/dividers includes only one signal combiner/divider.

Example 50: The apparatus of example 43, wherein: the first set of phased arrays and the second set of phased arrays each include a plurality of phased arrays, the first set of power dividers and the second set of power dividers each include a plurality of power dividers, and the set of signal combiner/dividers includes a plurality of signal combiner/dividers.

Example 51: The apparatus of example 43, wherein: a number of the first set of phased arrays is the same as a number of the second set of phased arrays, a number of the first set of power dividers is the same as a number of the second set of power dividers, the number of the first set of phased arrays is the same as the number of the first set of power dividers, and a number of the set of signal combiner/dividers is the same as the number of the first set of phased arrays.

Example 52: The apparatus of example 43, wherein: the first set of power dividers being coupled to the first set of phased arrays comprises a port of a plurality of ports of each power divider of the first set of power dividers being coupled to a phase shifter of a plurality of phase shifters of each phased array of the first set of phased arrays, and a number of the plurality of ports of each power divider is the same as a number of the plurality of phase shifters of each phased array of the first set of phased arrays.

Example 53: The apparatus of example 52, wherein: the second set of power dividers being coupled to the second set of phased arrays comprises a port of a plurality of ports of each power divider of the second set of power dividers being coupled to a phase shifter of a plurality of phase shifters of each phased array of the second set of phased arrays, and a number of the plurality of ports of each power divider is the same as a number of the plurality of phase shifters of each phased array of the second set of phased arrays.

Example 54: The apparatus of example 43, wherein: the set of signal combiner/dividers being coupled between the first set of power dividers and the second set of power dividers comprises each signal combiner/divider of the set of signal combiner/dividers being coupled to only one power divider of the first set of power dividers and only one power divider of the second set of power dividers.

Example 55: The apparatus of example 43, wherein each of the plurality of signal combiner/dividers comprises a plurality of low noise amplifiers and a plurality of circulators.

Example 56: The apparatus of example 55, wherein each of the plurality of signal combiner/dividers comprises two low noise amplifiers and two circulators.

Example 57: The apparatus of example 43, wherein the first set of power dividers and the second set of power dividers comprise Wilkinson dividers.

Example 58: An apparatus for wireless communication comprising a processor, memory coupled with the processor, the processor and memory configured to perform a method of any one of examples 1 through 57.

Example 59: An apparatus for wireless communication comprising at least one means for performing a method of any one of examples 1 through 57.

Example 60: A non-transitory computer-readable medium storing code for wireless communication comprising a processor, memory coupled with the processor, and instructions stored in the memory and executable by the processor to cause the apparatus to perform a method of any one of examples 1 through 57.

As used herein, the term "simultaneously" means that two events overlap, at least partially, in the time domain. For example, a first event may begin before a second event begins and end before the second event ends, but the two events are considered to occur simultaneously.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "example" is used herein to mean "serving as an example, instance, or illustration." Any aspect described herein as "example" is not necessarily to be construed as preferred or advantageous over other aspects. Unless specifically stated otherwise, the term "some" refers to one or more.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner.

Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims.

Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A source vehicle, comprising:
 a memory;
 at least one transceiver; and
 at least one processor communicatively coupled to the memory and the at least one transceiver, the at least one processor configured to:
  receive, from a roadside unit (RSU) via the at least one transceiver, a notification that the RSU is capable of repeating first radar signals transmitted by the source vehicle in non-line-of-sight (NLOS) directions from the source vehicle;
  receive, from an active radar repeater associated with the RSU, via the at least one transceiver, second radar signals for a radar beam sweep in at least one NLOS direction from the source vehicle;
  receive an angle of each beam of the radar beam sweep; and
  perform target object detection based, at least in part, on the second radar signals for the radar beam sweep in the at least one NLOS direction and the angle of each beam of the radar beam sweep.

2. The source vehicle of claim 1, wherein the at least one processor being configured to perform the target object detection comprises the at least one processor being configured to:
identify any target objects detected in a group of angles associated with the active radar repeater, and in a group of ranges greater than a group of ranges associated with the active radar repeater, as NLOS target objects.

3. The source vehicle of claim 2, wherein the at least one processor being configured to identify comprises the at least one processor being configured to:
generate an observation grid from at least the second radar signals, the observation grid representing a plurality of groups of angles and a plurality of groups of ranges, each of the plurality of groups of angles corresponding to an angle of a beam of the radar beam sweep, each of the plurality of groups of ranges greater than the group of ranges associated with the active radar repeater, wherein the plurality of groups of angles are associated with the group of angles associated with the active radar repeater; and
identify any target objects detected in the plurality of groups of angles and the plurality of groups of ranges as NLOS target objects.

4. The source vehicle of claim 3, wherein the at least one processor is further configured to:
detect at least one NLOS target object based on the target object detection; and
determine an angle between the source vehicle and the at least one NLOS target object based on an angle between the source vehicle and the active radar repeater, an angle between the active radar repeater and the at least one NLOS target object, a distance between the source vehicle and the active radar repeater, and a distance between the active radar repeater and the at least one NLOS target object.

5. The source vehicle of claim 4, wherein:
the angle between the source vehicle and the active radar repeater is based on a location of the active radar repeater,
the angle between the active radar repeater and the at least one NLOS target object is based on a group of angles of the plurality of groups of angles in which the at least one NLOS target object is detected,
the distance between the source vehicle and the active radar repeater is based on the group of ranges associated with the active radar repeater, and
the distance between the active radar repeater and the at least one NLOS target object is based on a group of ranges of the plurality of groups of ranges in which the at least one NLOS target object is detected.

6. The source vehicle of claim 3, wherein the at least one processor is further configured to:
receive, from the RSU via the at least one transceiver, a group delay of the active radar repeater, wherein the plurality of groups of ranges are determined based on the group delay; and
receive, from the RSU via the at least one transceiver, a location of the active radar repeater, wherein the active radar repeater is co-located with the RSU, or wherein the active radar repeater is not co-located with the RSU.

7. The source vehicle of claim 1, wherein the at least one processor is further configured to:
cause the at least one transceiver to transmit, to the RSU, a request to perform the radar beam sweep in the at least one NLOS direction, wherein the request includes a length of time to perform the radar beam sweep in the at least one NLOS direction.

8. The source vehicle of claim 1, wherein the at least one processor is further configured to:
receive, from the RSU via the at least one transceiver, an indication of a scheduled time at which the radar beam sweep in the at least one NLOS direction will be performed;
cause the at least one transceiver to transmit, to the RSU, a length of time to perform the radar beam sweep in the at least one NLOS direction; or
any combination thereof.

9. A roadside unit (RSU), comprising:
a memory;
at least one transceiver; and
at least one processor communicatively coupled to the memory and the at least one transceiver, the at least one processor configured to:
cause the at least one transceiver to transmit, to a source vehicle, a notification that the RSU is capable of repeating first radar signals transmitted by the source vehicle in non-line-of-sight (NLOS) directions from the source vehicle;
configure an active radar repeater to perform a radar beam sweep of second radar signals in at least one NLOS direction from the source vehicle; and
cause the at least one transceiver to transmit, to the source vehicle, an angle of each beam of the radar beam sweep.

10. The RSU of claim 9, wherein the at least one processor is further configured to:
cause the at least one transceiver to transmit, to the source vehicle, a location of the active radar repeater,
wherein the active radar repeater is co-located with the RSU, or
wherein the active radar repeater is not co-located with the RSU.

11. The RSU of claim 9, wherein the at least one processor is further configured to:
receive, from the source vehicle via the at least one transceiver, a request to perform the radar beam sweep in the at least one NLOS direction, wherein the request includes a length of time to perform the radar beam sweep in the at least one NLOS direction; and
instruct the active radar repeater to perform the radar beam sweep in the at least one NLOS direction for the requested length of time.

12. The RSU of claim 9, wherein the at least one processor is further configured to:
cause the at least one transceiver to transmit, to the source vehicle, an indication of a scheduled time at which the radar beam sweep in the at least one NLOS direction will be performed;
receive, from the source vehicle via the at least one transceiver, a length of time to perform the radar beam sweep in the at least one NLOS direction; and
instruct the active radar repeater to perform the radar beam sweep in the at least one NLOS direction for the requested length of time.

13. The RSU of claim 9, wherein the at least one processor is further configured to:
configure the active radar repeater to perform a beam sweep in each of a plurality of directions, wherein each of the plurality of directions corresponds to a lane of a roadway.

14. The RSU of claim 9, wherein the at least one processor is further configured to:
cause the at least one transceiver to transmit, to the source vehicle, a group delay of the active radar repeater.

15. The RSU of claim 9, wherein the at least one processor is further configured to:
receive, from the source vehicle via the at least one transceiver, a location of the source vehicle; and
configure the active radar repeater to beamform in a direction of the location of the source vehicle.

16. A method of non-line-of-sight (NLOS) target detection performed by a source vehicle, comprising:
receiving, at the source vehicle from a roadside unit (RSU), a notification that the RSU is capable of repeating first radar signals transmitted by the source vehicle in NLOS directions from the source vehicle;
receiving, at the source vehicle from an active radar repeater associated with the RSU, second radar signals for a radar beam sweep in at least one NLOS direction from the source vehicle;
receiving, at the source vehicle, an angle of each beam of the radar beam sweep; and
performing, by the source vehicle, target object detection based, at least in part, on the second radar signals for the radar beam sweep in the at least one NLOS direction and the angle of each beam of the radar beam sweep.

17. The method of claim 16, wherein the performing the target object detection comprises:
identifying any target objects detected in a group of angles associated with the active radar repeater, and in a group of ranges greater than a group of ranges associated with the active radar repeater, as NLOS target objects.

18. The method of claim 17, wherein the identifying comprises:
generating an observation grid from at least the second radar signals, the observation grid representing a plurality of groups of angles and a plurality of groups of ranges, each of the plurality of groups of angles corresponding to an angle of a beam of the radar beam sweep, each of the plurality of groups of ranges greater than the group of ranges associated with the active radar repeater, wherein the plurality of groups of angles are associated with the group of angles associated with the active radar repeater; and
identifying any target objects detected in the plurality of groups of angles and the plurality of groups of ranges as NLOS target objects.

19. A method of assisting non-line-of-sight (NLOS) target detection performed by a roadside unit (RSU), comprising:
transmitting, by the RSU to a source vehicle, a notification that the RSU is capable of repeating first radar signals transmitted by the source vehicle in NLOS directions from the source vehicle;
configuring, by the RSU, an active radar repeater to perform a radar beam sweep of second radar signals in at least one NLOS direction from the source vehicle; and
transmitting, by the RSU to the source vehicle, an angle of each beam of the radar beam sweep.

20. The method of claim 19, further comprising:
receiving, from the source vehicle, a request to perform the radar beam sweep in the at least one NLOS direction, wherein the request includes a length of time to perform the radar beam sweep in the at least one NLOS direction; and
instructing the active radar repeater to perform the radar beam sweep in the at least one NLOS direction for the requested length of time.

21. The method of claim 19, further comprising:
transmitting, to the source vehicle, an indication of a scheduled time at which the radar beam sweep in the at least one NLOS direction will be performed;
receiving, from the source vehicle, a length of time to perform the radar beam sweep in the at least one NLOS direction; and
instructing the active radar repeater to perform the radar beam sweep in the at least one NLOS direction for the requested length of time.

\* \* \* \* \*